(12) United States Patent
Yu et al.

(10) Patent No.: US 12,144,010 B2
(45) Date of Patent: Nov. 12, 2024

(54) DATA TRANSMISSION METHOD AND APPARATUS

(71) Applicant: HUAWEI TECHNOLOGIES CO., LTD., Shenzhen (CN)

(72) Inventors: Yinghui Yu, Beijing (CN); Odile Rollinger, Cambridge (GB); Hong Wang, Beijing (CN); Baokun Shan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 602 days.

(21) Appl. No.: 17/212,471

(22) Filed: Mar. 25, 2021

(65) Prior Publication Data

US 2021/0212074 A1    Jul. 8, 2021

Related U.S. Application Data

(63) Continuation of application No. PCT/CN2018/107782, filed on Sep. 26, 2018.

(51) Int. Cl.
*H04W 72/53* (2023.01)
*H04W 16/26* (2009.01)
(Continued)

(52) U.S. Cl.
CPC ........... *H04W 72/53* (2023.01); *H04W 72/23* (2023.01)

(58) Field of Classification Search
CPC ..... H04W 72/53; H04W 72/23; H04W 16/26; H04W 74/006; H04W 74/0833; Y02D 30/70
See application file for complete search history.

(56) References Cited

U.S. PATENT DOCUMENTS 10,667,146 B2 * 5/2020 Futaki ............... H04W 74/0833
10,791,546 B2 * 9/2020 Chen ..................... H04L 5/0055
(Continued)

FOREIGN PATENT DOCUMENTS

CN    103517271 A    1/2014
CN    104704884 A    6/2015
(Continued)

OTHER PUBLICATIONS

Qualcomm Incorporated, Early data transmission and SPS. 3GPP TSG RAN WG1 Meeting#90, Prague, Czechia, Aug. 21-25, 2017, R1-1712808, 19 pages.
(Continued)

*Primary Examiner* — Harry H Kim
(74) *Attorney, Agent, or Firm* — Rimon PC

(57) ABSTRACT

Embodiments of this application provide a data transmission method and an apparatus, and relate to the communications field, to reduce power consumption and a delay for sending uplink data by a terminal device. The method includes: A terminal device receives a first resource configuration from a network device, where the first resource configuration is used to indicate a first resource, and the first resource is used by the terminal device to send data when the terminal device is in an idle mode; and when the terminal device is in the idle mode and has to-be-sent first uplink data, the terminal device sends the first uplink data to the network device on the first resource. The embodiments of this application are used in an Internet of Things communications system.

8 Claims, 6 Drawing Sheets

(51) Int. Cl.
*H04W 52/02* (2009.01)
*H04W 72/23* (2023.01)
*H04W 74/00* (2009.01)
*H04W 74/0833* (2024.01)

(56) References Cited

U.S. PATENT DOCUMENTS

| | | | |
|---|---|---|---|
| 11,229,018 B2* | 1/2022 | Chen | H04L 5/0091 |
| 2013/0163573 A1* | 6/2013 | Oizumi | H04L 5/0053 370/336 |
| 2018/0220486 A1 | 8/2018 | Tseng et al. | |
| 2018/0249479 A1 | 8/2018 | Cho et al. | |
| 2019/0124715 A1* | 4/2019 | Chen | H04W 48/14 |
| 2020/0287695 A1* | 9/2020 | Wu | H04W 72/0446 |
| 2020/0374845 A1* | 11/2020 | Tang | H04L 5/0053 |
| 2021/0266945 A1* | 8/2021 | Ma | H04W 76/14 |
| 2021/0274568 A1* | 9/2021 | Sengupta | H04W 76/11 |
| 2021/0345395 A1* | 11/2021 | Chatterjee | H04W 56/0045 |
| 2024/0072979 A1* | 2/2024 | Jeon | H04W 24/08 |

FOREIGN PATENT DOCUMENTS

| | | |
|---|---|---|
| CN | 107613562 A | 1/2018 |
| CN | 108141840 A | 6/2018 |
| CN | 108141891 A | 6/2018 |
| WO | 2014019456 A1 | 2/2014 |
| WO | 2017113077 A1 | 7/2017 |
| WO | 2017161978 A1 | 9/2017 |

OTHER PUBLICATIONS

Intel Corporation, Early data transmission discussion for eFeMTC and FeNBIoT. 3GPP TSG RAN WG2 Meeting#99bis, Prague, Czech Republic, Oct. 9-13, 2017, R2-1710642, 7 pages.
Qualcomm Incorporated, Support for transmission in preconfigured UL resources. 3GPP TSG RAN WG1 Meeting #94, Gothenburg, Sweden, Aug. 20- Aug. 24, 2018, R1-1809032, 6 pages.
3GPP TS 38.331 V15.2.1 (Jun. 2018), 3rd Generation Partnership Project; Technical Specification Group Radio Access Network; NR; Radio Resource Control (RRC) protocol specification (Release 15), 303 pages.
3GPP TS 36.300 V15.2.0 (Jun. 2018), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 357 pages.
3GPP TS 36.331 V15.2.2 (Jun. 2018), 3rd Generation Partnership Project; Technical Specification Group Radio Access Network; Evolved Universal Terrestrial Radio Access (E-UTRA); Radio Resource Control (RRC); Protocol specification (Release 15), 791 pages.
3GPP TS 24.301 V15.4.0 (Sep. 2018), 3rd Generation Partnership Project; Technical Specification Group Core Network and Terminals; Non-Access-Stratum (NAS) protocol for Evolved Packet System (EPS); Stage 3 (Release 15), 530 pages.
3GPP TS 24.501 V15.1.0 (Sep. 2018), 3rd Generation Partnership Project; Technical Specification Group Core Network and Terminals; Non-Access-Stratum (NAS) protocol for 5G System (5GS); Stage 3 (Release 15), 398 pages.
3GPP TS 36.213 V15.2.0 (Jun. 2018), 3rd Generation Partnership Project; Technical Specification Group Radio Access Network; Evolved Universal Terrestrial Radio Access (E-UTRA); Physical layer procedures (Release 15), 541 pages.
3GPP TS 36.321 V15.2.0 (Jul. 2018), 3rd Generation Partnership Project; Technical Specification Group Radio Access Network; Evolved Universal Terrestrial Radio Access (E-UTRA); Medium Access Control (MAC) protocol specification (Release 15), 126 pages.

* cited by examiner

DATA TRANSMISSION METHOD AND APPARATUS

CROSS-REFERENCE TO RELATED APPLICATIONS

This application is a continuation of International Application No. PCT/CN2018/107782, filed on Sep. 26, 2018, the disclosure of which is hereby incorporated by reference in its entirety.

TECHNICAL FIELD

This application relates to the communications field, and in particular, to a data transmission method and apparatus.

BACKGROUND

Currently, the Internet of Things (IoT) is developing rapidly, and the 3rd Generation Partnership Project (3GPP) provides a narrow band Internet of Things (NB-IoT) network and a machine type communication (MTC) network based on a cellular network, and the NB-IoT network and the MTC network both use features of a narrow band technology to carry an IoT service. The MTC network belongs to a part of a conventional cellular network, and is applicable to an Internet of Things service with relatively high rates and mobility. The NB-IoT network uses a new radio technology independent of an existing cellular network (for example, long term evolution (LTE)), so that a terminal device has lower costs, and lower supported rates and mobility.

As shown in FIG. 1, currently, in a data transmission process (legacy procedure) or early data transmission (EDT) process of the NB-IoT network and the MTC network, the terminal device needs to initiate random access to transmit data.

In other words, before sending uplink data, the terminal device needs to send an access preamble (namely, a message 1 (MSG 1)) and receive a random access response message (namely, a message 2 (MSG 2)) on a random access channel, which causes extra power consumption and a delay. Therefore, there is an urgent need for a method that can reduce the power consumption and the delay for sending the uplink data by the terminal device.

SUMMARY

Embodiments of this application provide a data transmission method and apparatus, to reduce power consumption and a delay for sending uplink data by a terminal device.

According to a first aspect, an embodiment of this application provides a data transmission method, including: A terminal device receives a first resource configuration from a network device, where the first resource configuration is used to indicate a first resource, and the first resource is used by the terminal device to send data when the terminal device is in an idle mode; and when the terminal device is in an idle mode and has to-be-sent first uplink data, the terminal device sends the first uplink data to the network device on the first resource.

Based on the foregoing solution, the terminal device may receive the first resource configuration from the network device, where the first resource configuration is used to indicate the first resource, thereby implementing preconfiguration of an uplink resource (namely, the first resource). When the terminal device is in an idle mode and has to-be-sent first uplink data, the terminal device may send the to-be-sent first uplink data on the first resource without sending an MSG 1 and an MSG 2, thereby reducing power consumption and a delay generated in a process of sending uplink data by the terminal device. The uplink data may be carried on a data bearer or a dedicated traffic channel.

In a possible implementation, the first resource corresponds to a first coverage level; and the terminal device matches the first coverage level.

In a possible implementation, the first resource configuration is further used to indicate a second resource, and the second resource corresponds to a second coverage level; and the method further includes: If the terminal device fails to send the first uplink data on the first resource, the terminal device sends the first uplink data on the second resource.

In a possible implementation, the method further includes: If the terminal device fails to send the first uplink data on the first resource or the second resource, the terminal device sends a random access preamble to the network device, to perform uplink data transmission or uplink data transmission in an early data transmission manner.

In a possible implementation, the terminal device stores a valid timing advance (TA) received from the network device and a size of the first uplink data does not exceed a size of the first resource.

In a possible implementation, that the terminal device sends the first uplink data to the network device on the first resource includes: The terminal device sends the first uplink data to the network device on the first resource in a control plane manner or a user plane manner.

In a possible implementation, that the terminal device sends the first uplink data to the network device on the first resource in a control plane manner includes: The terminal device sends a first radio resource control (RRC) message to the network device on the first resource, where a non-access stratum (NAS) protocol data unit (PDU) of the first RRC message includes the first uplink data.

In a possible implementation, that the terminal device sends the first uplink data to the network device on the first resource in a user plane manner includes: The terminal device sends, to the network device on the first resource, data obtained after the first uplink data is multiplexed with a second RRC message.

In a possible implementation, the first uplink data meets a first service model and/or a first service attribute.

In a possible implementation, the first resource configuration includes a parameter indicating a time domain position and/or a frequency domain position of the first resource.

In a possible implementation, the first resource configuration further includes one or more of the following: a repetition number of the first resource; a first cell radio network temporary identity (C-RNTI) of the terminal device; a valid period of the first resource; an RRC configuration, used for data bearer establishment and/or access stratum AS security processing; and a periodic configuration of the first resource.

In a possible implementation, that a terminal device receives a first resource configuration from a network device includes: The terminal device receives dedicated signaling or a broadcast message from the network device, where the dedicated signaling or the broadcast message includes the first resource configuration.

In a possible implementation, the method further includes: The terminal device receives, from the network device, data obtained after downlink data is multiplexed with a third RRC message; or the terminal device receives a fourth RRC message from the network device, where the fourth RRC message includes one or more of the following:

contention resolution information; a second resource configuration, where the second resource configuration is used to indicate a third resource, and the third resource is used by the terminal device to send data when the terminal device is in an idle mode; a second C-RNTI of the terminal device; and an updated next hop chaining counter (NCC).

In a possible implementation, a NAS PDU in the fourth RRC message further includes first downlink data.

According to a second aspect, an embodiment of this application provides a data transmission method, including: A network device sends a first resource configuration to a terminal device, where the first resource configuration is used to indicate a first resource, and the first resource is used by the terminal device to send data when the terminal device is in an idle mode; and the network device receives first uplink data from the terminal device on the first resource.

In a possible implementation, the first resource corresponds to a first coverage level.

In a possible implementation, the first resource configuration is further used to indicate a second resource, and the second resource corresponds to a second coverage level; and the method further includes: The network device receives the first uplink data from the terminal device on the second resource.

In a possible implementation, the method further includes: If the network device fails to receive the first uplink data on the first resource or the second resource, the network device receives a random access preamble from the terminal device, to perform uplink data transmission or uplink data transmission in an early data transmission manner.

In a possible implementation, a size of the first uplink data does not exceed a size of the first resource; and before the network device sends the first resource configuration to the terminal device, the method further includes: The network device sends a valid timing advance TA to the terminal device.

In a possible implementation, that the network device receives the first uplink data from the terminal device on the first resource includes: The network device receives the first uplink data from the terminal device on the first resource in a control plane manner or a user plane manner.

In a possible implementation, that the network device receives the first uplink data from the terminal device on the first resource in a control plane manner includes: The network device receives a first radio resource control RRC message from the terminal device on the first resource, where a NAS PDU of the first RRC message includes the first uplink data.

In a possible implementation, that the network device receives the first uplink data from the terminal device on the first resource in a user plane manner includes: The network device receives, from the terminal device on the first resource, data obtained after the first uplink data is multiplexed with a second RRC message.

In a possible implementation, the first uplink data meets a first service model and/or a first service attribute.

In a possible implementation, the first resource configuration includes a parameter indicating a time domain position and/or a frequency domain position of the first resource.

In a possible implementation, the first resource configuration further includes one or more of the following: a repetition number of the first resource; a first cell radio network temporary identity C-RNTI of the terminal device; a valid period of the first resource; an RRC configuration, used for data bearer establishment and/or access stratum AS security processing; and a periodic configuration of the first resource.

In a possible implementation, that a network device sends a first resource configuration to a terminal device includes: The network device sends dedicated signaling or a broadcast message to the terminal device, where the dedicated signaling or the broadcast message includes the first resource configuration.

In a possible implementation, the method further includes: The network device sends, to the terminal device, data obtained after downlink data is multiplexed with a third RRC message; or the network device sends a fourth RRC message to the terminal device, where the fourth RRC message includes one or more of the following: contention resolution information; a second resource configuration, where the second resource configuration is used to indicate a third resource, and the third resource is used by the terminal device to send data when the terminal device is in an idle mode; a second C-RNTI of the terminal device; and an updated next hop chaining counter NCC.

In a possible implementation, a NAS PDU in the fourth RRC message further includes first downlink data.

According to a third aspect, an embodiment of this application provides a data transmission method, including: A terminal device obtains a first resource configured by a network device, where the first resource is used to send uplink data of a first service model and/or a first service attribute; and when the terminal device is in an idle mode and has to-be-sent first uplink data, the terminal device sends the to-be-sent first uplink data on the first resource.

Based on the foregoing solution, the terminal device may obtain the first resource configured by the network device, where the first resource is used to send the uplink data of the first service model and/or the first service attribute, thereby implementing preconfiguration of an uplink resource (namely, the first resource). When the terminal device is in an idle mode and has to-be-sent first uplink data, the terminal device may send the to-be-sent first uplink data on the first resource without sending an MSG 1 and an MSG 2, thereby reducing power consumption and a delay generated in a process of sending uplink data by the terminal device.

In a possible implementation, before the terminal device sends the to-be-sent first uplink data on the first resource, the method further includes: The terminal device determines a first coverage level of the terminal device; and the terminal device determines a first resource corresponding to the first coverage level; and that the terminal device sends the to-be-sent first uplink data on the first resource includes: The terminal device sends the to-be-sent first data on the first resource corresponding to the first coverage level. In this way, the terminal device may send the to-be-sent first uplink data on the first resource corresponding to the first coverage level without sending the MSG 1 and the MSG 2, thereby reducing power consumption and a delay generated in the process of sending the uplink data by the terminal device.

In a possible implementation, if the terminal device fails to send the to-be-sent first data on the first resource corresponding to the first coverage level, the method further includes: The terminal device sends the to-be-sent first uplink data on a first resource corresponding to a second coverage level, where the second coverage level is different from the first coverage level. For example, the second coverage level may be higher than the first coverage level. In other words, a repetition number of the first resource corresponding to the second coverage level may be greater than a repetition number of the first resource corresponding to the first coverage level.

In a possible implementation, the method further includes: If the terminal device fails to send the to-be-sent first uplink data on the first resource corresponding to the first coverage level; or if a quantity of times that the terminal device fails to send the to-be-sent first uplink data on the first resource exceeds a preset threshold; or if a valid period of the first resource in which the terminal device sends the uplink data expires, the terminal device stops sending the to-be-sent first uplink data on the first resource, and the terminal device sends a random access preamble to the network device, to perform uplink data transmission or uplink data transmission in an early data transmission manner.

In a possible implementation, that the terminal device sends the to-be-sent first uplink data on the first resource includes: If the terminal device determines that the terminal device has a valid TA and a size of the to-be-sent first uplink data does not exceed a size of the first resource, the terminal device sends the to-be-sent first uplink data on the first resource. The valid TA may be obtained from a process of communication with an access network device before the terminal device sends the to-be-sent first uplink data on the first resource. Alternatively, in the process of communication with the access network device, the terminal device may obtain a TA adjustment by using a media access control control element (MAC CE) in a connected mode, and regenerate a valid TA based on the TA adjustment and a TA obtained from a random access response message.

In a possible implementation, the to-be-sent first uplink data is carried in a NAS PDU, or the to-be-sent first uplink data is carried on a data bearer or a dedicated traffic channel.

In a possible implementation, if the to-be-sent first uplink data is carried in a NAS PDU, that the terminal device sends the to-be-sent first uplink data on the first resource includes: The terminal device sends a first RRC message on the first resource, where the first RRC message includes the NAS PDU and an identity of the terminal device.

In a possible implementation, if the to-be-sent first uplink data is carried on a data bearer or a dedicated traffic channel, that the terminal device sends the to-be-sent first uplink data on the first resource includes: The terminal device multiplexes the to-be-sent first uplink data and a second RRC message on the first resource for sending, where the to-be-sent first uplink data is carried on the data bearer or the dedicated traffic channel, and the second RRC message is carried on a common control channel or a dedicated control channel.

The data bearer is established by the terminal device based on stored configuration information, and the to-be-sent first uplink data is uplink data encrypted by the terminal device based on an access stratum security key. The second RRC message includes the identity of the terminal device and the access stratum security key.

In a possible implementation, that the terminal device sends the to-be-sent first uplink data on the first resource includes: If the to-be-sent first uplink data is generated based on the first service model and/or the first service attribute, the terminal device sends the to-be-sent first uplink data on the first resource. If the to-be-sent first uplink data is generated based on the first service model and the first service attribute, the terminal device may send the uplink data on a dedicated or shared first resource. If the to-be-sent first uplink data is generated based on the first service attribute, the terminal device may send the uplink data on the shared first resource. It should be understood that if the to-be-sent first uplink data is generated based on the first service attribute, the network device may determine a scheduling mode (for example, a sending occasion or a sending period) of the uplink data based on the first service attribute, so that the network device may obtain identities of terminal devices that may access within a period of time, to prevent the network device from blindly detecting excessive terminal devices, thereby shortening the delay and saving energy.

In a possible implementation, that a terminal device obtains a first resource configured by a network device includes: The terminal device receives configuration information of a first resource sent by the network device, where the configuration information of the first resource includes a time-frequency parameter of the first resource. The time-frequency parameter of the first resource may include at least one of: an effective time of the first resource, an uplink carrier indication of the first resource, a subcarrier indication, a quantity of resource units (RUs), a scheduling delay, a modulation and coding scheme (MCS), and a redundancy version (RV), or a quantity of hybrid automatic repeat request (HARQ) processes.

In a possible implementation, the configuration information of the first resource further includes one or more of the following: a repetition number of the first resource, a C-RNTI of the terminal device, a valid period of the first resource, a valid timer, where the timer is used to determine duration in which the terminal device stores the first resource after obtaining the first resource, RRC configuration information, and periodic configuration information of the first resource.

In a possible implementation, that the terminal device receives configuration information of the first resource sent by the network device includes: The terminal device receives downlink dedicated signaling or a broadcast message sent by the network device, where the downlink dedicated signaling or the broadcast message includes the configuration information of the first resource.

The downlink dedicated signaling includes, but is not limited to, a contention resolution message, a contention resolution MAC CE, an RRC connection setup message, an RRC connection resume message, an RRC early data transmission complete message, an RRC connection release message, an RRC one-shot data transmission complete message, an RRC connection re-establishment message, an RRC connection reconfiguration message, or the like.

In a possible implementation, after the terminal device sends the to-be-sent first uplink data on the first resource, the method further includes: The terminal device receives a downlink message sent by the network device, where the downlink message includes one or more types of the following information: a contention resolution information; a second resource allocated by the network device to the terminal device for next data transmission; a C-RNTI reallocated by the network device to the terminal device; and an NCC updated by the network device for the terminal device. The second resource is used by the terminal device to send uplink data of a second service model and/or a second service attribute, the second service model is the same as or different from the first service model, and the second service attribute is the same as or different from the first service attribute. A configuration parameter of the second resource may be the same as that of the first resource, and a value of the parameter may be the same as or different from that of the first resource.

In a possible implementation, the downlink message further includes downlink data, and the downlink data is carried in a NAS PDU, or the downlink data is carried on a data bearer or a dedicated traffic channel.

The downlink message includes, but is not limited to, a contention resolution message, a contention resolution MAC CE, an RRC connection step message, an RRC connection resume message, an RRC early data transmission complete message, an RRC connection release message, an RRC one-shot data transmission complete message, an RRC connection re-establishment message, an RRC connection reconfiguration message, or the like.

In a possible implementation, if the downlink data is carried in a NAS PDU, that the terminal device receives a downlink message sent by the network device includes: The terminal device receives a third RRC message sent by the network device, where the third RRC message includes the NAS PDU and an identity of the terminal device.

In a possible implementation, if the downlink data is carried on a data bearer or a dedicated traffic channel, that the terminal device receives a downlink message sent by the network device includes: The terminal device receives the downlink data and a fourth RRC message sent by the network device, where the downlink data is carried on the data bearer or the dedicated traffic channel, and the second RRC message is carried on a common control channel or a dedicated control channel.

The data bearer is established by the terminal device based on stored configuration information, and the downlink data is downlink data encrypted by the network device based on an access stratum security key.

According to a fourth aspect, an embodiment of this application provides a data transmission method, including: A network device configures a first resource, where the first resource is used to send uplink data of a first service model and/or a first service attribute; and the network device receives the uplink data sent by a terminal device on the first resource.

In a possible implementation, that the network device receives the uplink data sent by a terminal device on the first resource includes: The network device receives, on a first resource corresponding to a first coverage level, the uplink data sent by the terminal device; and the network device receives, on a first resource corresponding to a second coverage level, the uplink data sent by the terminal device, where the second coverage level is different from the first coverage level.

In a possible implementation, the uplink data sent on the first resource is carried in a non-access stratum data protocol unit NAS PDU, or the uplink data sent on the first resource is carried on a data bearer or a dedicated traffic channel.

In a possible implementation, if the uplink data is carried in a NAS PDU, that the network device receives the uplink data sent by the terminal device on the first resource includes: The network device receives a first radio resource control RRC message on the first resource, where the first RRC message includes the NAS PDU and an identity of the terminal device.

In a possible implementation, if the uplink data is carried on a data bearer or a dedicated traffic channel, that the network device receives the uplink data sent by the terminal device on the first resource includes: The network device receives the uplink data and a second RRC message on the first resource, where the uplink data is carried on the data bearer or the dedicated traffic channel, and the second RRC message is carried on a common control channel or a dedicated control channel.

The data bearer is established by the terminal device based on stored configuration information, and the uplink data is uplink data encrypted by the terminal device based on an access stratum security key. The second RRC message includes the identity of the terminal device and the access stratum security key.

In a possible implementation, that a network device configures a first resource includes: The network device sends configuration information of the first resource to the terminal device, where the configuration information of the first resource includes a time-frequency parameter of the first resource.

In a possible implementation, the configuration information of the first resource further includes one or more of the following: a repetition number of the first resource, a cell radio network temporary identity C-RNTI of the terminal device, a valid period of the first resource, a valid timer, where the timer is used to determine duration in which the terminal device stores the first resource after obtaining the first resource, RRC configuration information, and periodic configuration information of the first resource.

In a possible implementation, that the network device sends configuration information of the first resource to the terminal device includes: The network device sends downlink dedicated signaling or a broadcast message to the terminal device, where the downlink dedicated signaling or the broadcast message includes the configuration information of the first resource.

The downlink dedicated signaling includes, but is not limited to, a contention resolution message, a contention resolution MAC CE, an RRC connection setup message, an RRC connection resume message, an RRC early data transmission complete message, an RRC connection release message, an RRC one-shot data transmission complete message, an RRC connection re-establishment message, an RRC connection reconfiguration message, or the like.

In a possible implementation, the method further includes: The network device sends a downlink message to the terminal device, where the downlink message includes one or more types of the following information: contention resolution information, a second resource allocated by the network device to the terminal device for next data transmission, and a C-RNTI reallocated by the network device to the terminal device, and a next hop chaining counter NCC updated by the network device for the terminal device. The second resource is used by the terminal device to send uplink data of a second service model and/or a second service attribute, the second service model is the same as or different from the first service model, and the second service attribute is the same as or different from the first service attribute.

In a possible implementation, the downlink message further includes downlink data, and the downlink data is carried in a NAS PDU, or the downlink data is carried on a data bearer or a dedicated traffic channel.

The downlink message includes, but is not limited to, a contention resolution message, a contention resolution MAC CE, an RRC connection setup message, an RRC connection resume message, an RRC early data transmission complete message, an RRC connection release message, an RRC one-shot data transmission complete message, an RRC connection re-establishment message, an RRC connection reconfiguration message, or the like.

In a possible implementation, if the downlink data is carried in a NAS PDU, that the network device sends a downlink message to the terminal device includes: The network device receives a third RRC message sent by the terminal device, where the third RRC message includes the NAS PDU and an identity of the terminal device.

In a possible implementation, if the downlink data is carried on a data bearer or a dedicated traffic channel, that the network device sends a downlink message to the terminal device includes: The network device sends the downlink data and a fourth RRC message to the terminal device, where the downlink data is carried on the data bearer or the dedicated traffic channel, and the second RRC message is carried on a common control channel or a dedicated control channel.

The data bearer is established by the terminal device based on stored configuration information, and the downlink data is downlink data encrypted by the network device based on an access stratum security key.

According to a fifth aspect, an embodiment of this application provides a terminal device, including: a receiving unit, configured to obtain a first resource configured by a network device, where the first resource is used to send uplink data of a first service model and/or a first service attribute; and a sending unit, configured to: when the terminal device is in an idle mode and has to-be-sent first uplink data, send the to-be-sent first uplink data on the first resource.

In a possible implementation, the terminal device further includes: a determining unit, configured to: determine a first coverage level of the terminal device; and determine a first resource corresponding to the first coverage level; and a sending unit, configured to send the to-be-sent first data on the first resource corresponding to the first coverage level.

In a possible implementation, if the terminal device fails to send the to-be-sent first data on the first resource corresponding to the first coverage level, the sending unit is further configured to send the to-be-sent first uplink data on a first resource corresponding to a second coverage level, where the second coverage level is different from the first coverage level.

In a possible implementation, if the sending unit fails to send the to-be-sent first uplink data on the first resource corresponding to the first coverage level; or if a quantity of times that the sending unit sends the to-be-sent first uplink data on the first resource exceeds a preset threshold; or if a valid period of the first resource in which the sending unit sends the uplink data expires, the sending unit is further configured to stop sending the to-be-sent first uplink data on the first resource, and the terminal device sends a random access preamble to the network device, to perform uplink data transmission or uplink data transmission in an early data transmission manner.

In a possible implementation, the sending unit is configured to: if the determining unit determines that the terminal device has a valid TA and a size of the to-be-sent first uplink data does not exceed a size of the first resource, send the to-be-sent first uplink data on the first resource.

In a possible implementation, the to-be-sent first uplink data is carried in a non-access stratum data protocol unit NAS PDU, or the to-be-sent first uplink data is carried on a data bearer or a dedicated traffic channel.

In a possible implementation, if the to-be-sent first uplink data is carried in a NAS PDU, the sending unit is configured to send a first radio resource control RRC message on the first resource, where the first RRC message includes the NAS PDU and an identity of the terminal device.

In a possible implementation, if the to-be-sent first uplink data is carried on a data bearer or a dedicated traffic channel, the sending unit is configured to: multiplex the to-be-sent first uplink data and a second RRC message on the first resource for sending, where the to-be-sent first uplink data is carried on the data bearer or the dedicated traffic channel, and the second RRC message is carried on a common control channel or a dedicated control channel.

The data bearer is established by the terminal device based on stored configuration information, and the to-be-sent first uplink data is uplink data encrypted by the terminal device based on an access stratum security key. The second RRC message includes the identity of the terminal device and the access stratum security key.

In a possible implementation, the sending unit is configured to: If the to-be-sent first uplink data is generated based on the first service model and/or the first service attribute, send the to-be-sent first uplink data on the first resource.

In a possible implementation, the receiving unit is configured to receive configuration information of the first resource sent by the network device, where the configuration information of the first resource includes a time-frequency parameter of the first resource.

In a possible implementation, the configuration information of the first resource further includes one or more of the following: a repetition number of the first resource, a cell radio network temporary identity C-RNTI of the terminal device, a valid period of the first resource, a valid timer, where the timer is used to determine duration in which the terminal device stores the first resource after obtaining the first resource, RRC configuration information, and periodic configuration information of the first resource.

In a possible implementation, the receiving unit is configured to receive downlink dedicated signaling or a broadcast message sent by the network device, where the downlink dedicated signaling or the broadcast message includes the configuration information of the first resource.

The downlink dedicated signaling includes, but is not limited to, a contention resolution message, a contention resolution MAC CE, an RRC connection setup message, an RRC connection resume message, an RRC early data transmission complete message, an RRC connection release message, an RRC one-shot data transmission complete message, an RRC connection re-establishment message, an RRC connection reconfiguration message, or the like.

In a possible implementation, the receiving unit is further configured to receive a downlink message sent by the network device, where the downlink message includes one or more types of the following information: contention resolution information; a second resource allocated by the network device to the terminal device for next data transmission; a C-RNTI reallocated by the network device to the terminal device; and a next hop chaining counter NCC updated by the network device for the terminal device. The second resource is used by the terminal device to send uplink data of a second service model and/or a second service attribute, the second service model is the same as or different from the first service model, and the second service attribute is the same as or different from the first service attribute.

In a possible implementation, the downlink message further includes downlink data, and the downlink data is carried in a NAS PDU, or the downlink data is carried on a data bearer or a dedicated traffic channel.

The downlink message includes, but is not limited to, a contention resolution message, a contention resolution MAC CE, an RRC connection steup message, an RRC connection resume message, an RRC early data transmission complete message, an RRC connection release message, an RRC one-shot data transmission complete message, an RRC connection re-establishment message, an RRC connection reconfiguration message, or the like.

In a possible implementation, if the downlink data is carried in a NAS PDU, the receiving unit is configured to receive a third RRC message sent by the network device, where the third RRC message includes the NAS PDU and an identity of the terminal device.

In a possible implementation, if the downlink data is carried on a data bearer or a dedicated traffic channel, the receiving unit is configured to receive the downlink data and a fourth RRC message sent by the network device, where the downlink data is carried on the data bearer or the dedicated traffic channel, and the second RRC message is carried on a common control channel or a dedicated control channel.

The data bearer is established by the terminal device based on stored configuration information, and the downlink data is downlink data encrypted by the network device based on an access stratum security key.

According to a sixth aspect, an embodiment of this application provides a network device, including: a sending unit, configured to configure a first resource, where the first resource is used to send uplink data of a first service model and/or a first service attribute; and a receiving unit, configured to receive the uplink data sent by a terminal device on the first resource.

In a possible implementation, the receiving unit is configured to receive, on a first resource corresponding to a first coverage level, the uplink data sent by the terminal device; or receive, on a first resource corresponding toa second coverage level, the uplink data sent by the terminal device, where the second coverage level is different from the first coverage level.

In a possible implementation, the uplink data sent on the first resource is carried in a non-access stratum data protocol unit NAS PDU, or the uplink data sent on the first resource is carried on a data bearer or a dedicated traffic channel.

In a possible implementation, if the uplink data is carried in a NAS PDU, the receiving unit is configured to receive a first radio resource control RRC message on the first resource, where the first RRC message includes the NAS PDU and an identity of the terminal device.

In a possible implementation, if the uplink data is carried on a data bearer or a dedicated traffic channel, the receiving unit is configured to receive the uplink data and a second RRC message on the first resource, where the uplink data is carried on the data bearer or the dedicated traffic channel, and the second RRC message is carried on a common control channel or a dedicated control channel.

The data bearer is established by the terminal device based on stored configuration information, and the uplink data is uplink data encrypted by the terminal device based on an access stratum security key. The second RRC message includes the identity of the terminal device and the access stratum security key.

In a possible implementation, the sending unit is configured to send configuration information of the first resource to the terminal device by using the sending unit, where the configuration information of the first resource includes a time-frequency parameter of the first resource.

In a possible implementation, the configuration information of the first resource further includes one or more of the following: a repetition number of the first resource, a cell radio network temporary identity C-RNTI of the terminal device, a valid period of the first resource, a valid timer, where the timer is used to determine duration in which the terminal device stores the first resource after obtaining the first resource, RRC configuration information, and periodic configuration information of the first resource.

In a possible implementation, the sending unit is configured to send downlink dedicated signaling or a broadcast message to the terminal device by using the sending unit, where the downlink dedicated signaling or the broadcast message includes the configuration information of the first resource.

The downlink dedicated signaling includes, but is not limited to, a contention resolution message, a contention resolution MAC CE, an RRC connection setup message, an RRC connection resume message, an RRC early data transmission complete message, an RRC connection release message, an RRC one-shot data transmission complete message, an RRC connection re-establishment message, an RRC connection reconfiguration message, or the like.

In a possible implementation, the sending unit is further configured to send a downlink message to the terminal device, where the downlink message includes one or more types of the following information: contention resolution information, a second resource allocated by the network device to the terminal device for next data transmission, a C-RNTI reallocated by the network device to the terminal device, and a next hop chaining counter NCC updated by the network device for the terminal device. The second resource is used by the terminal device to send uplink data of a second service model and/or a second service attribute, the second service model is the same as or different from the first service model, and the second service attribute is the same as or different from the first service attribute.

In a possible implementation, the downlink message further includes downlink data, and the downlink data is carried in a NAS PDU, or the downlink data is carried on a data bearer or a dedicated traffic channel.

The downlink message includes, but is not limited to, a contention resolution message, a contention resolution MAC CE, an RRC connection setup message, an RRC connection resume message, an RRC early data transmission complete message, an RRC connection release message, an RRC data transmission complete message, an RRC connection re-establishment message, an RRC connection reconfiguration message, or the like.

In a possible implementation, if the downlink data is carried in a NAS PDU, the sending unit is configured to send a third RRC message to the terminal device, where the third RRC message includes the NAS PDU and an identity of the terminal device.

In a possible implementation, if the downlink data is carried on a data bearer or a dedicated traffic channel, the sending unit is configured to send the downlink data and a fourth RRC message to the terminal device, where the downlink data is carried on the data bearer or the dedicated traffic channel, and the second RRC message is carried on a common control channel or a dedicated control channel.

The data bearer is established by the terminal device based on stored configuration information, and the downlink data is downlink data encrypted by the network device based on an access stratum security key.

According to a seventh aspect, an embodiment of this application provides a terminal device, including a transceiver, configured to obtain a first resource configured by a network device, where the first resource is used to send uplink data of a first service model and/or a first service attribute. The transceiver is further configured to: when the terminal device is in an idle mode and has to-be-sent first uplink data, send the to-be-sent first uplink data on the first resource.

In a possible implementation, the terminal device further includes a processor, configured to determine a first coverage level of the terminal device; and determine a first resource corresponding to the first coverage level. The transceiver is configured to send the to-be-sent first data on the first resource corresponding to the first coverage level.

In a possible implementation, if the terminal device fails to send the to-be-sent first data on the first resource corresponding to the first coverage level, the transceiver is further configured to send the to-be-sent first uplink data on a first resource corresponding to a second coverage level, where the second coverage level is different from the first coverage level.

In a possible implementation, if the transceiver fails to send the to-be-sent first uplink data on the first resource corresponding to the first coverage level; or if a quantity of times that the transceiver fails to send the to-be-sent first uplink data on the first resource exceeds a preset threshold, or if a valid period of the first resource in which the transceiver sends the uplink data expires, the transceiver is further configured to stop sending the to-be-sent first uplink data on the first resource, and the terminal device sends a random access preamble to the network device, to perform uplink data transmission or uplink data transmission in an early data transmission manner.

In a possible implementation, the transceiver is configured to: if the processor determines that the terminal device has a valid TA and a size of the to-be-sent first uplink data does not exceed a size of the first resource, send the to-be-sent first uplink data on the first resource.

In a possible implementation, the to-be-sent first uplink data is carried in a non-access stratum data protocol unit NAS PDU, or the to-be-sent first uplink data is carried on a data bearer or a dedicated traffic channel.

In a possible implementation, if the to-be-sent first uplink data is carried in a NAS PDU, the transceiver is configured to send a first radio resource control RRC message on the first resource, where the first RRC message includes the NAS PDU and an identity of the terminal device.

In a possible implementation, if the to-be-sent first uplink data is carried on a data bearer or a dedicated traffic channel, the transceiver is configured to: multiplex the to-be-sent first uplink data and a second RRC message on the first resource for sending, where the to-be-sent first uplink data is carried on the data bearer or the dedicated traffic channel, and the second RRC message is carried on a common control channel or a dedicated control channel.

The data bearer is established by the terminal device based on stored configuration information, and the to-be-sent first uplink data is uplink data encrypted by the terminal device based on an access stratum security key. The second RRC message includes the identity of the terminal device and the access stratum security key.

In a possible implementation, the transceiver is configured to: If the to-be-sent first uplink data is generated based on the first service model and/or the first service attribute, send the to-be-sent first uplink data on the first resource.

In a possible implementation, the transceiver is configured to receive configuration information of the first resource sent by the network device, where the configuration information of the first resource includes a time-frequency parameter of the first resource.

In a possible implementation, the configuration information of the first resource further includes one or more of the following: a repetition number of the first resource, a cell radio network temporary identity C-RNTI of the terminal device, a valid period of the first resource, a valid timer, where the timer is used to determine duration in which the terminal device stores the first resource after obtaining the first resource, RRC configuration information, and periodic configuration information of the first resource.

In a possible implementation, the transceiver is configured to receive downlink dedicated signaling or a broadcast message sent by the network device, where the downlink dedicated signaling or the broadcast message includes the configuration information of the first resource.

The downlink dedicated signaling includes, but is not limited to, a contention resolution message, a contention resolution MAC CE, an RRC connection setup message, an RRC connection resume message, an RRC early data transmission complete message, an RRC connection release message, an RRC one-shot data transmission complete message, an RRC connection re-establishment message, an RRC connection reconfiguration message, or the like.

In a possible implementation, the transceiver is further configured to receive a downlink message sent by the network device, where the downlink message includes one or more types of the following information: contention resolution information; a second resource allocated by the network device to the terminal device for next data transmission; a C-RNTI reallocated by the network device to the terminal device; and a next hop chaining counter NCC updated by the network device for the terminal device. The second resource is used by the terminal device to send uplink data of a second service model and/or a second service attribute, the second service model is the same as or different from the first service model, and the second service attribute is the same as or different from the first service attribute.

In a possible implementation, the downlink message further includes downlink data, and the downlink data is carried in a NAS PDU, or the downlink data is carried on a data bearer or a dedicated traffic channel.

The downlink message includes, but is not limited to, a contention resolution message, a contention resolution MAC CE, an RRC connection setup message, an RRC connection resume message, an RRC early data transmission complete message, an RRC connection release message, an RRC one-shot data transmission complete message, an RRC connection re-establishment message, an RRC connection reconfiguration message, or the like.

In a possible implementation, if the downlink data is carried in a NAS PDU, the transceiver is configured to receive a third RRC message sent by the network device, where the third RRC message includes the NAS PDU and an identity of the terminal device.

In a possible implementation, if the downlink data is carried on a data bearer or a dedicated traffic channel, the transceiver is configured to receive the downlink data and a fourth RRC message sent by the network device, where the downlink data is carried on the data bearer or the dedicated traffic channel, and the second RRC message is carried on a common control channel or a dedicated control channel.

The data bearer is established by the terminal device based on stored configuration information, and the downlink data is downlink data encrypted by the network device based on an access stratum security key.

According to an eighth aspect, an embodiment of this application provides a network device, including a transceiver, configured to configure a first resource, where the first resource is used to send uplink data of a first service model and/or a first service attribute. The transceiver is further configured to receive the uplink data sent by a terminal device on the first resource.

In a possible implementation, the transceiver is configured to receive, on a first resource corresponding to a first coverage level, the uplink data sent by the terminal device; and receive, on a first resource corresponding to a second coverage level, the uplink data sent by the terminal device, where the second coverage level is different from the first coverage level.

In a possible implementation, the uplink data sent on the first resource is carried in a non-access stratum data protocol unit NAS PDU, or the uplink data sent on the first resource is carried on a data bearer or a dedicated traffic channel.

In a possible implementation, if the uplink data is carried in a NAS PDU, the transceiver is configured to receive a first radio resource control RRC message on the first resource, where the first RRC message includes the NAS PDU and an identity of the terminal device.

In a possible implementation, if the uplink data is carried on a data bearer or a dedicated traffic channel, the transceiver is configured to receive the uplink data and a second RRC message on the first resource, where the uplink data is carried on the data bearer or the dedicated traffic channel, and the second RRC message is carried on a common control channel or a dedicated control channel.

The data bearer is established by the terminal device based on stored configuration information, and the uplink data is uplink data encrypted by the terminal device based on an access stratum security key. The second RRC message includes the identity of the terminal device and the access stratum security key.

In a possible implementation, the transceiver is configured to send configuration information of the first resource to the terminal device by using the transceiver, where the configuration information of the first resource includes a time-frequency parameter of the first resource.

In a possible implementation, the configuration information of the first resource further includes one or more of the following: a repetition number of the first resource, a cell radio network temporary identity C-RNTI of the terminal device, a valid period of the first resource, a valid timer, where the timer is used to determine duration in which the terminal device stores the first resource after obtaining the first resource, RRC configuration information, and periodic configuration information of the first resource.

In a possible implementation, the transceiver is configured to send downlink dedicated signaling or a broadcast message to the terminal device by using the transceiver, where the downlink dedicated signaling or the broadcast message includes the configuration information of the first resource.

The downlink dedicated signaling includes, but is not limited to, a contention resolution message, a contention resolution MAC CE, an RRC connection setup message, an RRC connection resume message, an RRC early data transmission complete message, an RRC connection release message, an RRC one-shot data transmission complete message, an RRC connection re-establishment message, an RRC connection reconfiguration message, or the like.

In a possible implementation, the transceiver is further configured to send a downlink message to the terminal device, where the downlink message includes one or more types of the following information: contention resolution information, a second resource allocated by the network device to the terminal device for next data transmission, a C-RNTI reallocated by the network device to the terminal device, and a next hop chaining counter NCC updated by the network device for the terminal device. The second resource is used by the terminal device to send uplink data of a second service model and/or a second service attribute, the second service model is the same as or different from the first service model, and the second service attribute is the same as or different from the first service attribute.

In a possible implementation, the downlink message further includes downlink data, and the downlink data is carried in a NAS PDU, or the downlink data is carried on a data bearer or a dedicated traffic channel.

The downlink message includes, but is not limited to, a contention resolution message, a contention resolution MAC CE, an RRC connection setup message, an RRC connection resume message, an RRC early data transmission complete message, an RRC connection release message, an RRC data transmission complete message, an RRC connection re-establishment message, an RRC connection reconfiguration message, or the like.

In a possible implementation, if the downlink data is carried in a NAS PDU, the transceiver is configured to send a third RRC message to the terminal device, where the third RRC message includes the NAS PDU and an identity of the terminal device.

In a possible implementation, if the downlink data is carried on a data bearer or a dedicated traffic channel, the transceiver is configured to send the downlink data and a fourth RRC message to the terminal device, where the downlink data is carried on the data bearer or the dedicated traffic channel, and the second RRC message is carried on a common control channel or a dedicated control channel.

The data bearer is established by the terminal device based on stored configuration information, and the downlink data is downlink data encrypted by the network device based on an access stratum security key.

According to a ninth aspect, a terminal device is provided, including units configured to perform any method according to the first aspect or the third aspect. For example, a receiving unit and a sending unit are included.

According to a tenth aspect, a network device is provided, including units configured to perform any method according to the second aspect or the fourth aspect. For example, a sending unit and a receiving unit are included.

According to an eleventh aspect, an embodiment of this application provides an apparatus. The apparatus exists in a product form of a chip. A structure of the apparatus includes a processor and a memory. The memory is configured to be coupled to the processor, and store a program instruction and data for the apparatus. The processor is configured to execute the program instruction stored in the memory, so that the apparatus performs functions of the terminal device in the first aspect and any implementation or functions of the network device in the second aspect and any implementation in the foregoing method.

According to a twelfth aspect, an embodiment of this application provides a terminal device or a network device. The terminal device or the network device may implement corresponding functions in the foregoing method embodiments. The functions may be implemented by hardware, or may be implemented by hardware by executing corresponding software. The hardware or software includes one or more modules corresponding to the foregoing functions.

In a possible design, a structure of the terminal device or the network device includes a processor and a communications interface, and the processor is configured to support the terminal device or the network device in performing corresponding functions in the foregoing method. The communications interface is configured to support communication between the terminal device or the network device and another network element. The terminal device or the network device may further include a memory. The memory is configured to be coupled to the processor, and stores a program instruction and data for the terminal device or the network device.

According to a thirteenth aspect, an embodiment of this application provides a computer readable storage medium, including instructions. When the instructions are run on a computer, the computer is caused to perform any method according to the first aspect or the second aspect.

According to a fourteenth aspect, an embodiment of this application provides a computer program product including instructions. When the instructions are run on a computer, the computer is caused to perform any method according to the first aspect or the second aspect.

According to a fifteenth aspect, a network management system is provided. The system includes the terminal device according to the third aspect or the fifth aspect and the network device according to the fourth aspect or the sixth aspect.

DESCRIPTION OF EMBODIMENTS

A data transmission method and apparatus provided in the embodiments of this application may be applied to an Internet of Things communications system, for example, an Internet of Things communications system in a long term evolution (LTE) (namely, a 4th generation mobile communications technology (4G)) network, or an Internet of Things communications systems in a 5th generation mobile communications technology (5G) network.

Figure 1:
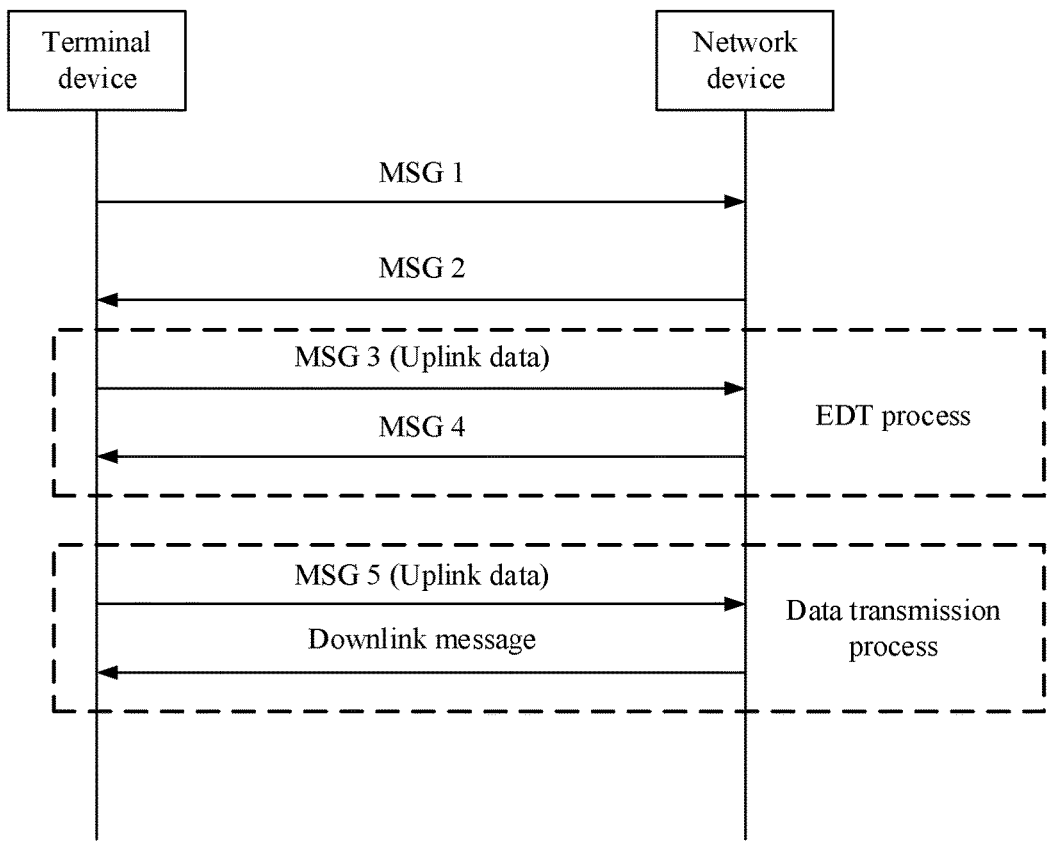
FIG. 1 is a schematic diagram of a data transmission process or an early data transmission process in the conventional technology.
Figure 2:
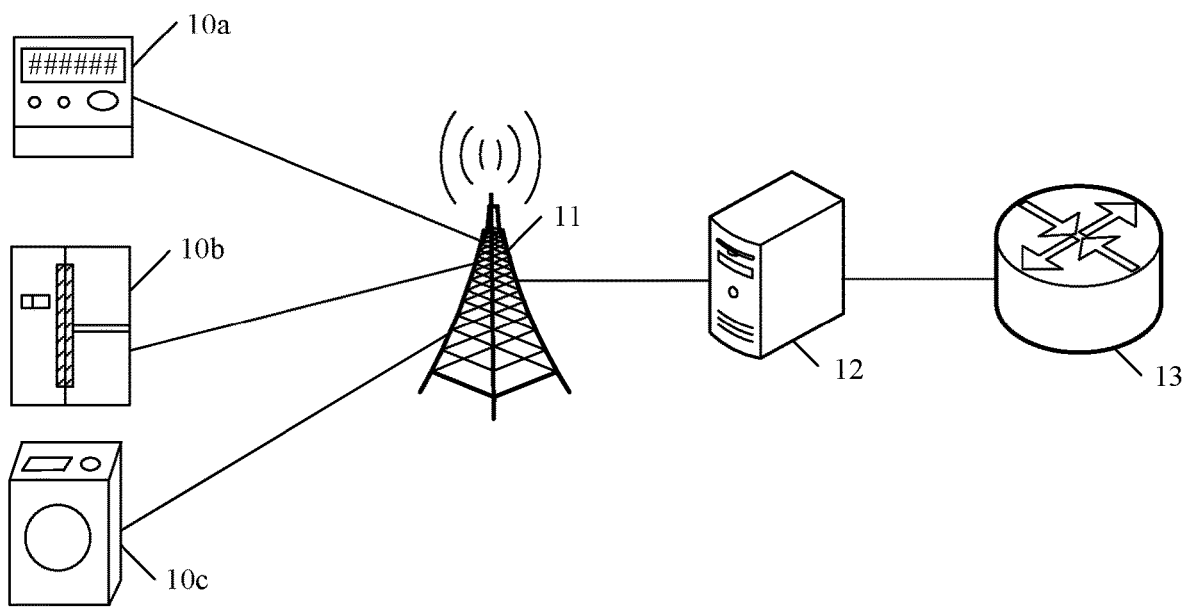
FIG. 2 is a schematic architectural diagram of a system for a data transmission method according to an embodiment of this application.

FIG. 2 is a schematic architectural diagram of an Internet of Things communications system according to an embodiment of this application. The Internet of Things communications system includes at least one terminal device (three terminal devices are used as an example in FIG. 2, which are respectively an electricity meter 10a, a refrigerator 10b, and a washing machine 10c), a network device (for example, a base station 11), a mobility management entity 12, and a gateway 13. The terminal device and the network device may camp on a same cell. Uplink data transmission and downlink data transmission of the terminal device are completed through interaction between the terminal device (for example, the electricity meter 10a), the network device 11, the mobility management entity 12, and the gateway 13.

It should be noted that, in an LTE network, the base station 11 may be an evolved node base station (eNB), the mobility management entity 12 may be a mobility management entity (MME), and the MME is mainly responsible for mobility management and session management on a control plane. The gateway 13 may be a serving gateway (SGW) or a packet data network gateway (PGW). The SGW is a user plane functional entity and is configured to route and forward packet data. The PGW is a gateway connected to an external data network. In actual network deployment, the SGW and the PGW may be integrally deployed and are generally collectively referred to as a gateway. The terminal device may access an external public data network (PDN) by establishing connections between the terminal device and an SGW and a PGW of an evolved universal terrestrial radio access network (E-UTRAN).

In a 5G network, the base station 11 may be a next generation node base station (gNB), a new radio base station (eNB), a macro base station, a micro base station, a high-frequency base station, a transmission and reception point (TRP), or the like. The mobility management entity 12 may be an access and mobility management function (AMF) entity. The gateway may be a session management function (SMF) network element, a user plane function (UPF) network element, or the like. The AMF network element is mainly responsible for mobility management. The AMF network element may also be referred to as an AMF device or an AMF entity. The SMF network element is mainly responsible for session management. The SMF network element may also be referred to as an SMF device or an SMF entity. The UPF is mainly responsible for processing, for example, forwarding, a user message (uplink data).

The terminal device provided in this embodiment of this application may be various devices in the IoT, for example, may be a device such as an electricity meter, a washing machine, a refrigerator, a rice cooker, a television, a sound, a watch, a coffee maker, a soymilk maker, a bread maker, a printer, or an oiler.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

The following describes the technical solutions in the embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of this application, unless otherwise specified, "at least one" refers to one or more. "A plurality of" refers to two or more than two. In addition, for ease of clearly describing the technical solutions in the embodiments of this application, words such as "first" and "second" are used in the embodiments of this application to distinguish same items or similar items that have basically the same functions and effects. A person skilled in the art may understand that the words "first" and "second" do not limit a quantity and an execution order, and the words "first" and "second" do not necessarily limit a difference.

It should be noted that in the embodiments of this application, "of" "corresponding (corresponding, related)", and "corresponding" may sometimes be used together. It should be noted that meanings to be expressed are consistent when differences are not emphasized.

Names of messages between network elements or names of parameters in messages in the following embodiments of this application are merely an example, and may alternatively be other names in specific implementation. This is not specifically limited in the embodiments of this application.

Figure 3:
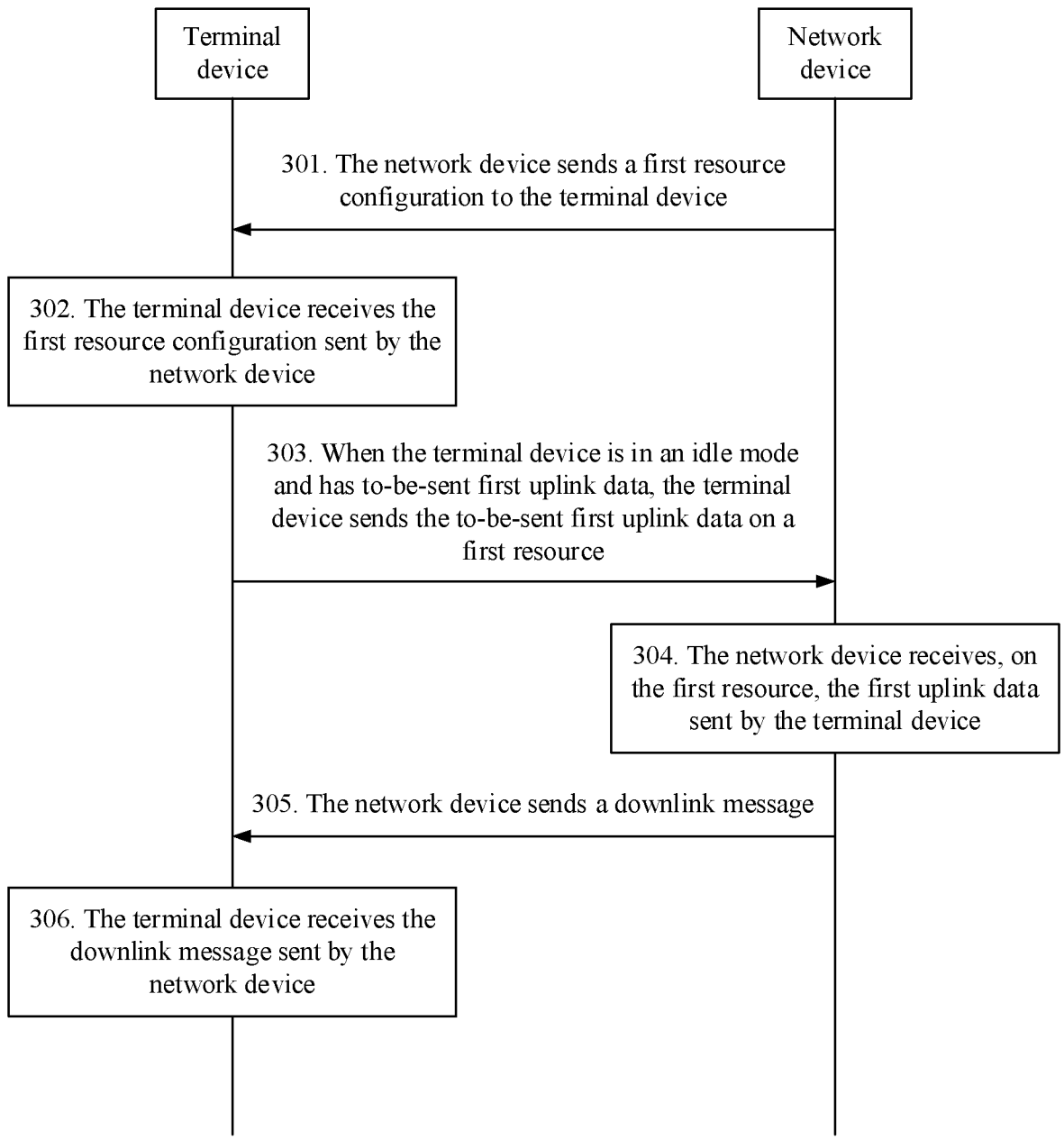
FIG. 3 is a schematic signal interaction diagram of a data transmission method according to an embodiment of this application.

An embodiment of this application provides a data transmission method. As shown in FIG. 3, the method includes the following steps.

301. A network device sends a first resource configuration to a terminal device.

The first resource configuration is used to indicate a first resource, and the first resource is used by the terminal device to send data when the terminal device is in an idle mode.

The first resource may also be referred to as a reserved resource. The first resource may be used to send uplink data of a first service model; or the first resource may be used to send uplink data of a first service attribute; or the first resource may be used to send uplink data of a first service model and a first service attribute. The first service model and/or the first service attribute may be a service model and/or a service attribute corresponding to the terminal device.

The first service model may include a scheduling time, a service period, and the like. The scheduling time may be time information of known service scheduling, for example, a fixed time point in a day of a month of a year, and the terminal device may perform uplink data transmission. The service period may include a periodic service indication or a length indication of the service period, and is used to indicate an interval at which uplink data transmission may be performed once. In this embodiment of this application, content included in the first service model is described above, and details are not described one by one.

The first service attribute may be a data packet arrival attribute. For example, a single uplink data packet may arrive, or a single uplink data packet may arrive with a single downlink data packet. For another example, a single downlink data packet may arrive, or a single downlink data packet may arrive with a single uplink data packet. In this embodiment of this application, content included in the first service attribute is described above, and details are not described one by one.

In a possible design, the network device configures a first resource for the terminal device, the first resource may be a first resource dedicated to the terminal device, and the first resource may be configured by the terminal device by using dedicated signaling. In another possible design, the network device configures a shared (common) first resource, and the first resource is configured by using dedicated signaling or a broadcast message.

For example, the network device configures a shared first resource for a plurality of (for example, 10, 20, or 30) terminal devices, and the first resource is used by the plurality of terminal devices to send uplink data of a first service model and/or a first service attribute. For example, the first resource may be used by the plurality of terminal devices to send periodic uplink data. The first service model and/or the first service attribute may be a same service model and/or a same service attribute corresponding to the plurality of terminal devices.

302. The terminal device receives the first resource configuration sent by the network device.

The terminal device may obtain, by receiving downlink dedicated signaling or a broadcast message sent by the network device, the first resource configuration sent by the network device. The downlink dedicated signaling may be downlink dedicated signaling used when the terminal device communicates with an access network last time (which may also be understood as last time). The downlink dedicated signaling is, for example, but is not limited to, a contention resolution message, a contention resolution MAC CE, an RRC connection setup message, an RRC connection resume message, an RRC early data transmission complete message, an RRC connection release message, an RRC one-shot data transmission complete message, an RRC connection re-establishment message, or an RRC connection reconfiguration message.

The downlink dedicated signaling or the broadcast message may include the first resource configuration (which may also be referred to as configuration information of the first resource). The first resource configuration includes a parameter indicating a time domain position and/or a frequency domain position of the first resource. The parameter indicating a time domain position and/or a frequency domain position of the first resource may be referred to as a time-frequency parameter of the first resource, including at least one of an effective time of the first resource, an uplink carrier indication of the first resource, a subcarrier indication, a quantity of resource units (RUs), a scheduling delay, and a modulation and coding scheme (MCS), a redundancy version, or a quantity of HARQ processes. The effective time of the first resource is used to indicate a moment at which the first resource is effective for data transmission of the terminal device, and the moment may be represented by a system frame number (SFN), a subframe, a hyper system frame number (hyper SFN, HSFN), a time offset of a reference time point (for example, SFN=0, or HSFN=0 and SFN=0) of a system, an application layer time point, or the like. For example, assuming that the effective time of the first resource is a first subframe, the terminal device may perform data transmission from the first subframe. The uplink carrier indication is used to indicate an uplink carrier on which the first resource is located. For an NB-IoT system, a bandwidth of one carrier is 180 kHz or 200 kHz, and for an MTC system, a bandwidth of one carrier is 1.4 MHz. The uplink carrier indication is optional indication information. If there is no indication, the terminal device considers by default that an uplink carrier of the first resource is an uplink carrier used by the terminal device in previous communication, or the uplink carrier is an uplink carrier corresponding to a currently monitored downlink carrier, or the uplink carrier is an uplink anchor carrier. The subcarrier indication is used to indicate information about one or more uplink subcarriers on which an uplink resource is located. In the NB-IoT system, a bandwidth of the uplink subcarrier is 3.75 kHz or 15 kHz. In the MTC system, a bandwidth of one subcarrier is 15 kHz. The scheduling delay is how soon can uplink data transmission start after the effective time of the first resource.

Optionally, the configuration information of the first resource may further include one or more of the following: a repetition number of the first resource, a repetition number of a DCI subframe, RRC configuration information, a first C-RNTI of the terminal device, a valid period of the first resource, a timer used to determine duration in which the terminal device stores the first resource after obtaining the first resource, or periodic configuration information of the first resource.

The repetition number of the first resource indicates that the first resource may be repeatedly sent, so that uplink data sent on the first resource may also be repeatedly sent. First resources with different repetition numbers correspond to terminal devices at different coverage levels. In other words, terminal devices at different coverage levels may use first resources with different repetition numbers to send uplink data. For example, a terminal device at a relatively high coverage level corresponds to a first resource with a relatively high repetition number. For example, for the NB-IoT network, an access network device may configure first resources at different coverage levels such as 0, 1, and 2 (namely, first resources with different repetition numbers). In other words, the first resource may be configured based on the coverage level. It should be understood that the coverage level 0 may be set as the lowest coverage level, the coverage level 1 is higher than the coverage level 0, and the coverage level 2 is higher than the coverage level 1. Alternatively, the coverage level 0 may be set as the highest coverage level, the coverage level 1 is lower than the coverage level 0, and the coverage level 2 is lower than the coverage level 1. This is not limited in this application. For the MTC network, the access network device may configure a first resource in Mode A and a first resource in Mode B. Mode A and Mode B may be distinguished by using different repetition numbers of the first resource.

In a possible design, the network device (for example, the access network device) may separately allocate first resources to terminal devices at different coverage levels. Sizes of the first resources allocated to the terminal devices at different coverage levels may be the same or different. For example, the access network device separately allocates a first resource 0, a first resource 1, and a first resource 2 to three terminal devices whose coverage levels are respectively 0, 1, and 2. Transport block sizes (TBSs) of the first resource 0, the first resource 1, and the first resource 2 may be the same or different. In another possible design, the access network device may alternatively allocate a same first resource to terminal devices at all coverage levels without distinguishing coverage levels.

The RRC configuration information includes an access stratum (AS) context of the terminal device, and the AS context includes, but is not limited to, data bearer configuration information, AS security parameter information, and the like. Based on the AS context, the terminal device may complete data bearer establishment and/or AS security processing. The RRC configuration information may further include NCC information, and the terminal device may perform AS security processing based on the NCC and the AS context. A C-RNTI of the terminal device may be a C-RNTI used by the terminal device during previous data communication, or may be a new C-RNTI allocated by the access network device to the terminal device when previous communication ends. The terminal device may store the C-RNTI in an idle mode, to scramble uplink data. The valid period of the first resource is used to indicate duration in which the terminal device can transmit data by using the first resource after the network device enables the first resource, namely, how long can the terminal device use the first resource after the effective time of the first resource. For example, the valid period of the first resource may be 10 seconds, 20 seconds, 30 seconds, or 1 minute. To be specific, duration in which the terminal device can send uplink data by using the first resource is 10 seconds, 20 seconds, 30 seconds, or 1 minute. If the valid period is not configured, the base station may use a default valid period. The valid period of the first resource may further include a valid timer. The timer is used to determine duration in which the terminal device stores the configuration information of the first resource after obtaining the first resource, or the timer is used by the terminal device to determine duration in which radio resource configuration information is stored. For example, the valid period of the timer may be 30 minutes, 1 hour, 2 hours, or 1 day. If the valid timer is not configured, the terminal device may store the first resource, or the terminal device may store the first resource until a moment at which next communication is initiated. The periodic configuration information of the first resource may include a period of the first resource, for example, how often the first resource appears (that is, how often there is one first resource). The resource period is configurable. For example, the resource period may be 10 milliseconds, 20 milliseconds, 40 milliseconds, 100 milliseconds, 1 second, 1 minute, several minutes, or longer.

303. When the terminal device is in an idle mode and has to-be-sent first uplink data, the terminal device sends the to-be-sent first uplink data on the first resource.

In a possible design, if the access network device configures the first resource based on a coverage level, the terminal device may first determine the coverage level at which the terminal device is located before sending the uplink data. The terminal device matches a first coverage level, and the first resource corresponds to the first coverage level. That the terminal device matches a first coverage level means that the coverage level of the terminal device is the first coverage level (the terminal device is at the first coverage level), or the first coverage level is higher than the coverage level of the terminal device. In other words, the terminal device selects a more appropriate coverage level as much as possible to send data.

For example, the terminal device may perform measurement based on an idle mode, and determine the first coverage level at which the terminal device is located by comparing a measurement result and a value relationship between thresholds of different coverage levels. The measurement based on the idle mode includes at least one of the following: measurement of reference signal received power (RSRP), reference signal received quality (RSRQ), channel state information measurement (CSI), or the like.

For example, it is assumed that the access network device configures four RSRP thresholds, including an RSRP threshold for a coverage level 3, an RSRP threshold for a coverage level 2, an RSRP threshold for a coverage level 1, and an RSRP threshold for a coverage level 0. When the RSRP threshold for the coverage level 3 is lower than (weaker than/less than) the RSRP threshold for the coverage level 2, the RSRP threshold for the coverage level 2 is lower than the RSRP threshold for the coverage level 1, and the RSRP threshold for the coverage level 1 is lower than the RSRP threshold for the coverage level 0, if an RSRP value measured by the terminal device is lower than the RSRP threshold for the coverage level 3, the terminal device determines that the terminal device is located at the coverage level 3; if the terminal device determines that the measured RSRP value is lower than the RSRP threshold for the coverage level 2 and higher than the RSRP threshold for the coverage level 3, the terminal device determines that the terminal device is located at the coverage level 2; if the terminal device determines that the measured RSRP value is lower than the RSRP threshold for the coverage level 1 and higher than the RSRP threshold for the coverage level 2, the terminal device determines that the terminal device is located at the coverage level 1; and if the terminal device determines that the measured RSRP value is lower than the RSRP threshold for the coverage level 0 and higher than the RSRP threshold for the coverage level 1, the terminal device determines that the terminal device is located at the coverage level 0. When the RSRP threshold for the coverage level 0 is lower than (weaker than/less than) the RSRP threshold for the coverage level 1, the RSRP threshold for the coverage level 1 is lower than the RSRP threshold for the coverage level 2, and the RSRP threshold for the coverage level 2 is lower than the RSRP threshold for the coverage level 3, if an RSRP value measured by the terminal device is lower than the RSRP threshold for the coverage level 0, the terminal device determines that the terminal device is located at the coverage level 0; if the terminal device determines that the measured RSRP value is lower than the RSRP threshold for the coverage level 1 and higher than the RSRP threshold for the coverage level 0, the terminal device determines that the terminal device is located at the coverage level 1; if the terminal device determines that the measured RSRP value is lower than the RSRP threshold for the coverage level 2 and higher than the RSRP threshold for the coverage level 1, the terminal device determines that the terminal device is located at the coverage level 2; and if the terminal device determines that the measured RSRP value is lower than the RSRP threshold for the coverage level 3 and higher than the RSRP threshold for the coverage level 2, the terminal device determines that the terminal device is located at the coverage level 3.

In a possible design, the first resource configuration is further used to indicate a second resource, the second resource corresponds to a second coverage level, and if the terminal device fails to send the first uplink data on the first resource, the terminal device sends the first uplink data on the second resource.

The second coverage level is different from the first coverage level. For example, the other coverage level may be higher than the first coverage level. To be specific, a repetition number of the first resource corresponding to the other coverage level may be greater than a repetition number of the first resource corresponding to the first coverage level.

For example, it is assumed that the access network device configures first resources at coverage levels 0, 1, 2, and 3, where the coverage level 0 is the lowest coverage level, the coverage level 1 is higher than the coverage level 0, the coverage level 2 is higher than the coverage level 1, and the coverage level 3 is higher than the coverage level 2. If the terminal device determines that the terminal device is located at the coverage level 0, the terminal device sends the uplink data on the first resource corresponding to the coverage level 0. When the terminal device fails to send the uplink data on the first resource corresponding to the coverage level 0, the terminal device may select to send the uplink data on the second resource corresponding to at least one of the coverage levels 1, 2, and 3 configured by the network device.

If the first resource configured by the network device includes a first resource corresponding to one coverage level (for example, the coverage level 3), namely, the first resource is a dedicated first resource, the terminal device may directly use the first resource to perform uplink data transmission; or the terminal device determines whether a coverage level at which the terminal device is currently located is the same as one coverage level (the coverage level 3) configured by the network device. For example, the terminal device may determine, based on a measurement result of an idle mode, whether a repetition number of the uplink resource is equal to a repetition number of the first resource. The repetition number of the uplink resource may be a repetition number of a physical random access channel (PRACH) resource randomly accessed or a repetition number of a physical uplink shared channel (PUSCH) resource. If the repetition numbers are the same, the terminal device uses the first resource configured by the network device to send the uplink data. If the repetition numbers are different, the terminal device does not use the first resource configured by the network device to send the uplink data. Alternatively, if the terminal device determines that the terminal device is in a static state or a non-moving state, the terminal device may compare whether a repetition number of an uplink channel (for example, a repetition number of a PUSCH channel) used in previous communication with the access network device is the same as the repetition number of the first resource. If the repetition numbers are the same, the terminal device uses the first resource configured by the network device to send the uplink data. If the repetition numbers are different, the terminal device does not use the first resource configured by the network device to send the uplink data. Alternatively, the terminal device determines whether the coverage level at which the terminal device is currently located is less than or equal to the coverage level 3. For example, the terminal device may determine, based on the measurement result of the idle mode, whether the repetition number of the uplink resource or whether the repetition number of the uplink channel used when the terminal device communicates with the access network device last time is less than or equal to the repetition number of the first resource. If the repetition number of the uplink resource or the uplink channel used when the terminal device communicates with the access network device last time is less than or equal to the repetition number of the first resource, the terminal device sends the uplink data by using the first resource configured by the network device. If the repetition number of the uplink resource or the repetition number of the uplink channel used when the terminal device communicates with the access network device last time is greater than the repetition number of the first resource, the terminal device does not use the first resource configured by the network device to send the uplink data.

If the terminal device fails to send the uplink data on the dedicated first resource, the terminal device may send the uplink data by using the shared second resource. For example, if the access network device has configured the second resource corresponding to at least one of the coverage levels 1, 2, and 3 by using dedicated signaling or a broadcast message, and the terminal device has also obtained the second resource corresponding to at least one of the coverage levels 1, 2, and 3, the terminal device may send the uplink data at at least one of the coverage levels 1, 2, and 3. Alternatively, the terminal device may select a second resource corresponding to a corresponding coverage level based on the coverage level at which the terminal device is located. This is not limited in this application.

If the terminal device fails to send the first uplink data on the first resource or the second resource, the terminal device sends a random access preamble to the network device, to perform uplink data transmission or uplink data transmission in an early data transmission manner.

Specifically, if the terminal device fails to send the uplink data on the first resource corresponding to the first coverage level, or a quantity of times that the terminal device fails to send the uplink data exceeds a threshold (for example, after the terminal device fails to send the uplink data on the first resource corresponding to the first coverage level, the terminal device fails to send the uplink data on the second resource corresponding to the one or more second coverage levels), or a valid period of the first resource or the second resource in which the terminal device sends the uplink data expires, the terminal device stops sending the uplink data on the first resource. The terminal device may send a first random access preamble to the access network device on a first random access time-frequency resource, to perform uplink data transmission in an early data transmission manner. Alternatively, the terminal device may send a second random access preamble to the access network device on a second random access time-frequency resource, to start uplink data transmission. The first random access time-frequency resource or the first random access preamble is or both are used to identify early data transmission, and the second random access time-frequency resource or the second random access preamble is or both are used to identify uplink data transmission.

In a possible design, if the access network device does not configure the first resource based on the coverage level, the terminal device may directly send the uplink data on the first resource.

In a possible design, if the terminal device stores a valid TA received from the network device and a size of the first uplink data does not exceed a size of the first resource, when the terminal device is in an idle mode and has to-be-sent first uplink data, namely, when the terminal device receives upper-layer data (namely, to-be-sent first uplink data, for example, application layer data) of the terminal device in an idle mode, the terminal device sends the to-be-sent first uplink data on the first resource. In other words, when the terminal device is in an idle mode and has to-be-sent first uplink data, if the terminal device has a valid TA, and the terminal device determines that a size of the to-be-sent first uplink data does not exceed a size of the first resource (namely, a TBS of the first resource), the terminal device sends the to-be-sent first uplink data on the first resource.

It should be noted that before sending the to-be-sent first uplink data on the first resource, the terminal device already has the valid TA. The valid TA may be obtained by the terminal device from a process of communication with the access network device before the terminal device sends the to-be-sent first uplink data on the first resource. For example, the terminal device may obtain the valid TA from a random access response message in a random access process by using the access network device. Alternatively, in a process of communication with the access network device, the terminal device may obtain a TA adjustment in a connected mode by using a MAC CE, and regenerate a valid TA based on the TA adjustment and a TA obtained from a random access response message. Then, when releasing the connection to the access network device, the terminal device may store a TA (namely, a valid TA) at a release moment. The terminal device may maintain the valid TA in an idle mode. In this embodiment of this application, the method for obtaining the valid TA by the terminal device is described above, and details are not described one by one.

In a possible design, when the terminal device is in an idle mode and has to-be-sent first uplink data, if the terminal device has a valid TA and a size of the to-be-sent first uplink data does not exceed a size of the first resource, and if the to-be-sent first uplink data is generated based on a first service model and/or a first service attribute, the terminal device sends the to-be-sent first uplink data on the first resource. The size of the to-be-sent first uplink data may be a size of an upper-layer data packet, or the size of the uplink data includes a signaling size of an RRC layer or a MAC CE size of a MAC layer, or the size of the uplink data may be a size of a MAC PDU including the uplink data. In this embodiment of this application, for meanings of the size of the uplink data, refer to descriptions in this part. Details are not described one by one.

The first uplink data meets the first service model and/or the first service attribute. In other words, the first uplink data may be data generated by the terminal device based on the first service model and/or the first service attribute. For the first service model and/or the first service attribute, refer to related descriptions in step 301. Details are not described herein again.

If the to-be-sent first uplink data is generated based on the first service model and the first service attribute, the terminal device may send the uplink data on a dedicated or shared first resource. If the to-be-sent first uplink data is generated based on the first service attribute, the terminal device may send the uplink data on the shared first resource. It should be understood that if the to-be-sent first uplink data is generated based on the first service attribute, the network device may determine a scheduling mode (for example, a sending occasion or a sending period) of the uplink data based on the first service attribute, so that the network device may obtain identities (for example, cell radio network temporary identities (C-RNTIs)) of terminal devices that may access within a period of time, to prevent the network device from blindly detecting excessive terminal devices, thereby shortening the delay and saving energy.

The terminal device may send the first uplink data to the network device on the first resource in a control plane manner. To be specific, the terminal device may send a first RRC message on the first resource, where the first RRC message includes a NAS PDU and an identity of the terminal device, and the to-be-sent first uplink data is carried in the NAS PDU. The identity (ID) of the terminal device includes, but is not limited to, a NAS identity, for example, a system architecture evolution temporary mobile subscriber identity (S-TMSI); an AS identity, for example, a resume identity ID; and a radio network temporary identity, for example, a cell RNTI or another RNTI. Optionally, the first RRC message may further include an access reason of the terminal device.

The first RRC message may be used to send the to-be-sent first uplink data to the network device. The first RRC message includes, but is not limited to, an RRC connection setup request message, an RRC connection resume request message, an RRC early data transmission request message, an RRC connection re-establishment request message, an RRC one-shot data transmission request message, or the like.

In addition, if the to-be-sent first uplink data is greater than the TBS of the first resource (namely, when the first resource is insufficient for the terminal device to send the uplink data), the terminal device may send the uplink data with reference to a data transmission process or an early data transmission process in the conventional technology. Details are not described herein again.

304. The network device receives, on the first resource, the first uplink data sent by the terminal device.

The network device may receive, based on the configuration information of the first resource, the first uplink data sent by the terminal device. When the network device needs to receive the uplink data at a plurality of coverage levels, the network device receives, based on the configuration information of the first resources at different coverage levels, the uplink data sent by terminal devices at different coverage levels.

For example, the network device may receive, on a first resource corresponding to a first coverage level corresponding to the terminal device, the first uplink data sent by the terminal device. Alternatively, the network device may receive, on a second resource corresponding to a second coverage level, the uplink data sent by the terminal device. The other coverage level is different from the first coverage level. For example, the another coverage level may be higher than the first coverage level, namely, a repetition number of the second resource corresponding to the another coverage level may be greater than a repetition number of the first resource corresponding to the first coverage level. Alternatively, the network device may receive, on resources (including the first resource and the second resource) of all coverage levels, the uplink data sent by the terminal device.

After receiving, on the first resource, the uplink data sent by the terminal device, the network device may send the uplink data to the MME. For example, the network device may transmit the uplink data to the MME by using an initial user message or a new S1 interface message. The MME may also be an AMF, and the S1 interface may be an NG interface.

Optionally, the network device may receive downlink data of the terminal device sent by the MME, and forward the downlink data to the terminal device. For example, the network device may receive a downlink (DL) NAS transport message (TRANSPORT) sent by the MME. The DL NAS TRANSPORT includes a NAS PDU, and the NAS PDU includes the downlink data. In addition, if there is no downlink data to be transmitted, the MME may send connection establishment indication information to the network device, to complete establishment of the S1 interface.

305. The network device sends a downlink message.

In a possible design, the network device may reallocate a C-RNTI to the terminal device in the downlink message, or the network device may send a second resource configuration in the downlink message. The second resource configuration is used to indicate a third resource, and the third resource is used by the terminal device to send data when the terminal device is in an idle mode. A parameter in the second resource configuration may be the same as the parameter in the first resource configuration, and a value of the parameter may be the same as or different from that of the first resource.

The downlink message is, for example, but is not limited to, a contention resolution message, a contention resolution MAC CE, an RRC connection setup message, an RRC connection resume message, an RRC early data transmission complete message, an RRC connection release message, an RRC one-shot data transmission complete message, an RRC connection re-establishment message, or an RRC connection reconfiguration message.

306. The terminal device receives the downlink message sent by the network device.

In a possible design, the terminal device may receive a fourth RRC message from the network device. The fourth RRC message may include downlink information. Further, a NAS PDU in the fourth RRC message further includes first downlink data. The downlink information includes one or more of the following: contention resolution information, a second resource configuration, where the second resource configuration is used to indicate a third resource, and the third resource is used by the terminal device to send data when the terminal device is in an idle mode; a second C-RNTI of the terminal device; and an updated NCC.

The fourth RRC message is, for example, but is not limited to, a contention resolution message, a contention resolution MAC CE, an RRC connection setup message, an RRC connection resume message, an RRC early data transmission complete message, an RRC connection release message, an RRC one-shot data transmission complete message, an RRC connection re-establishment message, or an RRC connection reconfiguration message.

Based on the foregoing solution, the terminal device may receive the first resource configuration from the network device, where the first resource configuration is used to indicate the first resource, thereby implementing preconfiguration of an uplink resource (namely, the first resource). When the terminal device is in an idle mode and has to-be-sent first uplink data, the terminal device may send the to-be-sent first uplink data on the first resource without sending an MSG 1 and an MSG 2, thereby reducing power consumption and a delay generated in a process of sending uplink data by the terminal device. The uplink data may be carried in the NAS PDU of the first RRC message.

Figure 4:
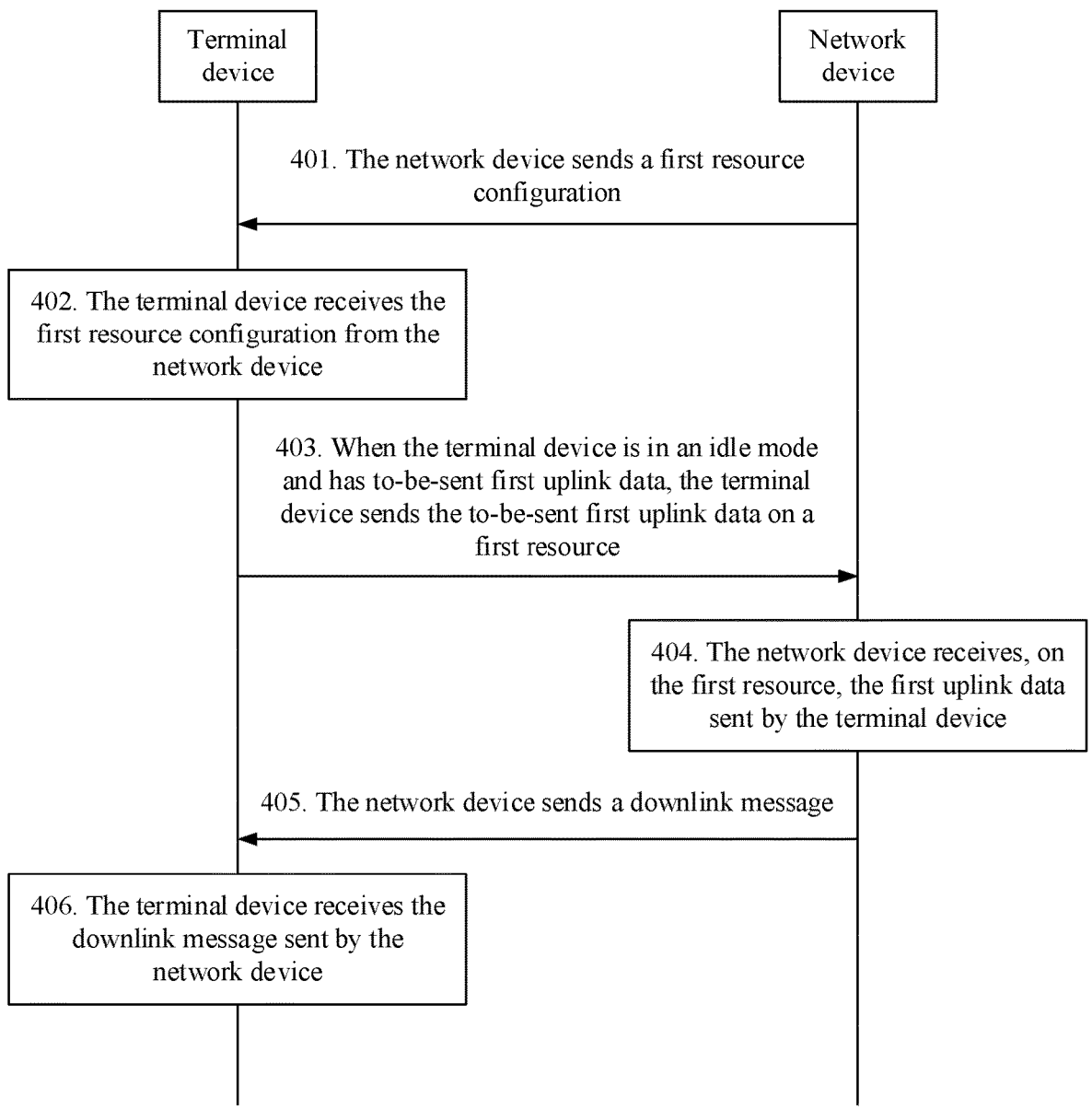
FIG. 4 is another schematic signal interaction diagram of a data transmission method according to an embodiment of this application.

An embodiment of this application provides a data transmission method. As shown in FIG. 4, the method includes the following steps.

401. A network device sends a first resource configuration.

For specific descriptions, refer to step 301.

402. A terminal device receives the first resource configuration from the network device.

For specific descriptions, refer to step 302.

403. When the terminal device is in an idle mode and has to-be-sent first uplink data, the terminal device sends the to-be-sent first uplink data on a first resource.

In a possible design, if an access network device configures the first resource based on a coverage level, the terminal device may first determine the coverage level at which the terminal device is located before sending the uplink data. For related descriptions, refer to step 303.

In a possible design, when the terminal device is in an idle mode and has to-be-sent first uplink data, if the terminal device determines that the terminal device has a valid TA and a size of the to-be-sent first uplink data does not exceed a size of the first resource (namely, a TBS of the first resource), the terminal device sends the to-be-sent first uplink data on the first resource. For related descriptions, refer to step 303.

In a possible design, when the terminal device is in an idle mode and has to-be-sent first uplink data, if the terminal device determines that the terminal device has a valid TA and a size of the to-be-sent first uplink data does not exceed a size of the first resource, and if the to-be-sent first uplink data is generated based on a first service model and/or a first service attribute, the terminal device sends the to-be-sent first uplink data on the first resource. For related descriptions, refer to step 303.

The terminal device may send the first uplink data to the network device on the first resource in a user plane manner. To be specific, the terminal device may send, to the network device on the first resource, data obtained after the first uplink data is multiplexed with a second RRC message. The to-be-sent first uplink data may be carried on a user data radio bearer (DRB) or a dedicated traffic channel (DTCH). The DRB may also be referred to as a data bearer, and the data bearer is mapped to the DTCH channel. The second RRC message may be carried on a common control channel (CCCH). The CCCH channel and the DTCH channel multiplex the first resource configured by the network device. The data bearer is established by the terminal device based on stored configuration information, the to-be-sent first uplink data is uplink data encrypted by the terminal device based on an access stratum security key, and the second RRC message includes an identity of the terminal device and the access stratum security key. The access stratum security key is generated by the terminal device based on a stored AS security parameter and an NCC, and includes an RRC integrity protection key, an RRC encryption key, and the like. The NCC may be received by the terminal device by using an RRC connection release message in a previous process of communication with the access network device.

The second RRC message includes, but is not limited to, an RRC connection setup request message, an RRC connection resume request message, an RRC early data transmission request message, an RRC connection re-establishment request message, an RRC one-shot data transmission request message, and the like.

In addition, if the to-be-sent first uplink data is greater than the TBS of the first resource (namely, when the first resource is insufficient for the terminal device to send the uplink data), the terminal device may send the uplink data with reference to a data transmission process or an early data transmission process in the conventional technology. Details are not described herein again. For specific descriptions, refer to step 303.

404. The network device receives, on the first resource, the first uplink data sent by the terminal device.

The network device may receive, based on the configuration information of the first resource, first uplink data sent by the terminal device. When the network device needs to receive the uplink data at a plurality of coverage levels, the network device receives, based on the configuration information of the first resource corresponding to different coverage levels, the uplink data sent by the terminal device.

In a possible design, the network device may receive, on a first resource corresponding to a first coverage level corresponding to the terminal device, first uplink data sent by the terminal device. Alternatively, the network device may receive, on a second resource corresponding to a second coverage level, the uplink data sent by the terminal device. The other coverage level is different from the first coverage level. For example, the other coverage level may be higher than the first coverage level. To be specific, a repetition number of the first resource corresponding to the other coverage level is greater than a repetition number of the first resource corresponding to the first coverage level. Alternatively, the network device may receive, on configured resources (including the first resource and the second resource) of all coverage levels, the uplink data sent by the terminal device.

Before receiving the second RRC message on the first resource, the network device may send a context request message of the terminal device based on the identity of the terminal device (for example, a resume ID of an AS layer) to a base station connected to the terminal device last time. The context request message of the terminal device includes an AS security parameter of the terminal device. The base station connected to the terminal device last time completes security authentication of the terminal device based on the AS security parameter. After the security authentication of the terminal device succeeds, the base station sends a context of the terminal device to the network device, where the context of the terminal device includes the AS security parameter and an NCC parameter that are of the terminal device and that are stored on a network side. The network device establishes a bearer between the network device and the terminal device based on the received context of the terminal device and a bearer parameter in the context, and receives, based on the bearer, the second RRC message and the uplink data that are transmitted by the terminal device on the data bearer or the DTCH channel. The network device further updates an AS security key based on the NCC parameter and the AS security parameter, and decrypts the uplink data by using the updated AS security key.

Then, the network device may send a context resume request of the terminal device to an MME, to request the MME to resume an S1 connection to the terminal device. The network device receives a context resume response message of the terminal device sent by the MME, to indicate that the S1 connection to the terminal device has been resumed. The context resume response message of the terminal device sent by the MME includes a user plane path of an S1 interface, namely, a route address from the network device to a gateway. Then, the network device sends the uplink data to the gateway (for example, an SGW or a PGW).

Optionally, the network device may receive downlink data of the terminal device sent by the gateway, and forward the downlink data to the terminal device.

405. The network device sends a downlink message.

In a possible design, the network device may send contention resolution information to the terminal device by using the downlink message, or reallocate a C-RNTI to the terminal device. The network device may also configure a third resource for the terminal device in the downlink message, and the third resource is used by the terminal device to send data when the terminal device is in an idle mode. The network device may further update the NCC for the terminal device, so that the terminal device encrypts the uplink data during next data transmission by using an access stratum security key generated based on the updated NCC and the AS security parameter.

The downlink message is, for example, but is not limited to, a contention resolution message, a contention resolution MAC CE, an RRC connection setup message, an RRC connection resume message, an RRC early data transmission complete message, an RRC connection release message, an RRC one-shot data transmission complete message, an RRC connection re-establishment message, or an RRC connection reconfiguration message.

Optionally, if the network device receives the downlink data of the terminal device sent by the gateway, the network device may send the downlink message and the downlink data that is carried on the DTCH channel to the terminal device.

406. The terminal device receives the downlink message sent by the network device.

In a possible design, the terminal device receives, from the network device, data obtained after the downlink data is multiplexed with a third RRC message. To be specific, the terminal device may receive the third RRC message and the downlink data on the DTCH channel that are sent by the network device. The third RRC message includes downlink information. The downlink data is carried on a data bearer or a dedicated traffic channel, and the third RRC message is carried on a CCCH channel or a DCCH channel. The data bearer is established by the terminal device based on stored configuration information, and the downlink data is downlink data encrypted by the network device based on the access stratum security key.

In another possible design, the terminal device receives a fourth RRC message from the network device. The fourth RRC message includes a downlink message.

The downlink message may include downlink information, and the downlink information includes one or more of the following: contention resolution information, a second resource configuration, where the second resource configuration is used to indicate a third resource, and the third resource is used by the terminal device to send data when the terminal device is in an idle mode; a second C-RNTI of the terminal device; and an updated NCC. For related descriptions, refer to step 306.

Based on the foregoing solution, the terminal device may receive the first resource configuration from the network device, where the first resource configuration is used to indicate the first resource, thereby implementing preconfiguration of an uplink resource (namely, the first resource). When the terminal device is in an idle mode and has to-be-sent first uplink data, the terminal device may send the to-be-sent first uplink data on the first resource without sending an MSG 1 and an MSG 2, thereby reducing power consumption and a delay generated in a process of sending uplink data by the terminal device. The uplink data may be carried on a data bearer or a dedicated traffic channel.

The foregoing mainly describes the solutions provided in the embodiments of this application from perspectives of the terminal device and the network device. It may be understood that, to implement the foregoing functions, the terminal device and the network device include corresponding hardware structures and/or software modules for performing the functions. A person skilled in the art should easily be aware that, in combination with the algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, functional modules may be divided on the terminal device and the network device based on the foregoing method examples. For example, each functional module may be obtained through division based on each function, or two or more functions may be integrated into one processing module. The integrated module may be implemented in a form of hardware, or may be implemented in a form of a software functional module. It should be noted that, in this embodiment of this application, module division is merely an example, and is merely a logical function division. In actual implementation, another division manner may be used.

Figure 5:
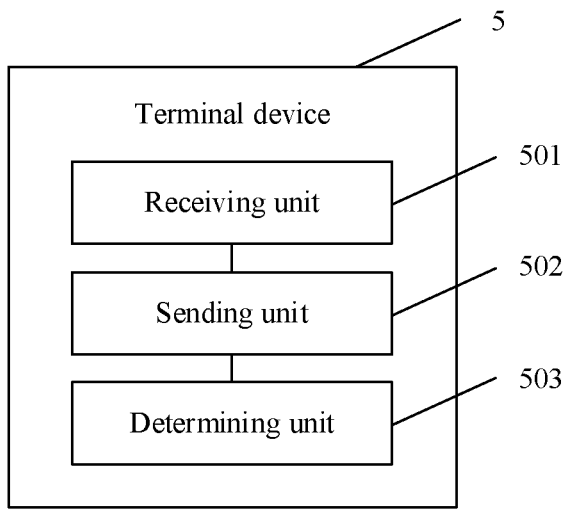
FIG. 5 is a schematic structural diagram of a terminal device according to an embodiment of this application.

When each functional module is obtained through division for each corresponding function, FIG. 5 shows a possible schematic structural diagram 1 of a terminal device 5 in the foregoing embodiment. The terminal device includes a receiving unit 501 and a sending unit 502. In this embodiment of this application, the receiving unit 501 is configured to receive a first resource configuration from a network device, where the first resource configuration is used to indicate a first resource, and the first resource is used by the terminal device to send data when the terminal device is in an idle mode. The sending unit 502 is configured to: when the terminal device is in an idle mode and has to-be-sent first uplink data, send the first uplink data to the network device on the first resource. The terminal device further includes a determining unit 503, configured to determine a first coverage level matching the terminal device; and determine a first resource corresponding to the first coverage level. The sending unit 502 is configured to send the to-be-sent first data on the first resource corresponding to the first coverage level. The receiving unit 501 is configured to support the terminal device in performing the processes 302 and 306 in FIG. 3, and the processes 402 and 406 in FIG. 4. The sending unit 502 is configured to support the terminal device in performing the process 303 in FIG. 3, and the process 403 in FIG. 4. The determining unit 503 is configured to support the terminal device in performing the process 303 in FIG. 3, and the process 403 in FIG. 4.

Figure 6:
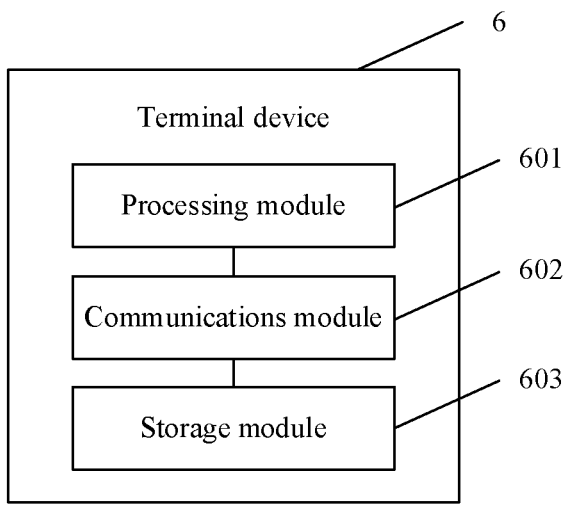
FIG. 6 is a schematic structural diagram of another terminal device according to an embodiment of this application.

When an integrated unit is used, FIG. 6 shows a possible schematic structural diagram 2 of a terminal device in the foregoing embodiment. In this application, the terminal device may include a processing module 601, a communications module 602, and a storage module 603. The processing module 601 is configured to control all parts of hardware apparatuses, application program software, and the like of the terminal device. The communications module 602 is configured to receive an instruction and/or data sent by another device, and may send data of the terminal device to another device. The storage module 603 is configured to store a software program, store data, run software, and the like of the terminal device. The processing module 601 may be a determining unit or a controller, such as may be a central processing unit (CPU), a general-purpose determining unit, a digital signal determining unit (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The determining unit may also be a combination for implementing a calculation function, for example, a combination of one or more micromonitoring units, or a combination of a DSP and a micromonitoring unit. The communications module 602 may be a transceiver, a transceiver circuit, a communications interface, or the like. The storage module 603 may be a memory.

Figure 7:
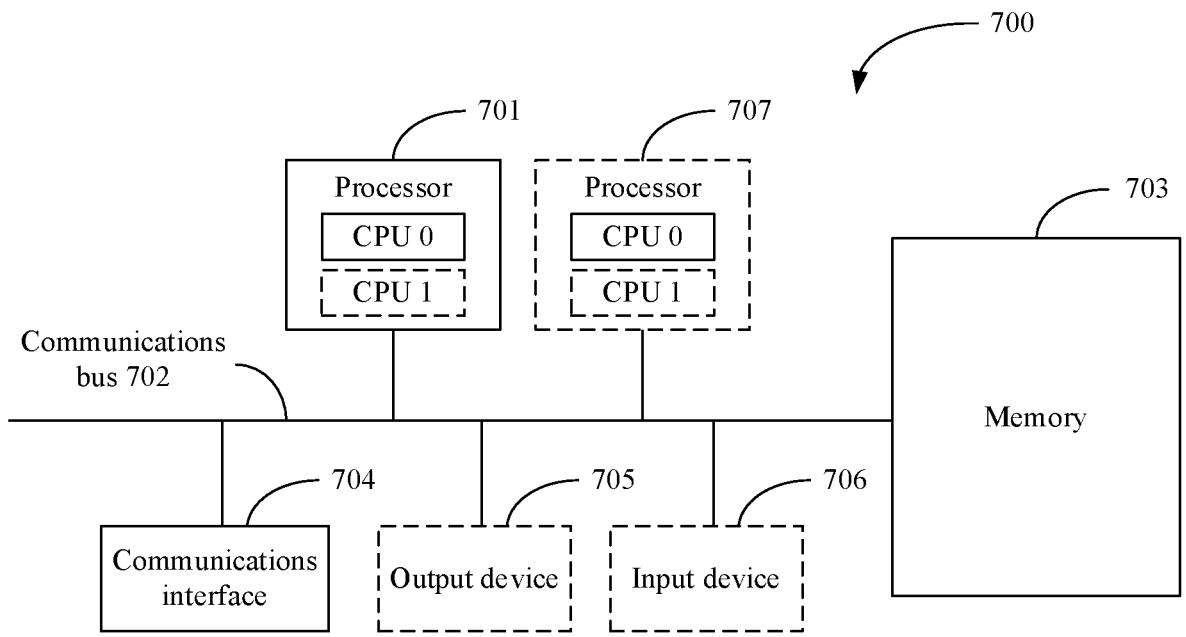
FIG. 7 is a schematic structural diagram of still another terminal device according to an embodiment of this application.

In a possible design, the terminal device may be implemented by using a structure (an apparatus or a system) in FIG. 7.

FIG. 7 is a schematic diagram of a structure according to an embodiment of this application. The structure 700 includes at least one processor 701, a communications bus 702, a memory 703, and at least one communications interface 704.

The processor 701 may be a CPU, a micromonitoring unit, an ASIC, or one or more integrated circuits configured to control program execution in the solutions of this application.

The communications bus 702 may include a channel for transmitting information between the foregoing components.

The communications interface 704 uses any apparatus such as a transceiver, and is configured to communicate with another device or a communications network, for example, an Ethernet, a radio access network (RAN), or a wireless local area network (WLAN).

The memory 703 may be a read-only memory (ROM) or another type of static storage device that can store static information and an instruction, a random access memory (RAM) or another type of dynamic storage device that can store information and an instruction, an electrically erasable programmable read-only memory (EEPROM), a compact disc read-only memory (CD-ROM) or another optical disc storage, optical disk storage (including compressed optical discs, laser discs, optical discs, digital versatile optical discs, Blu-ray discs, and the like), magnetic disk storage medium or another magnetic storage device, or any other medium capable of carrying or storing desired program code in the form of instructions or data structures and capable of being accessed by a computer, but not limited thereto. The memory may exist independently, and is connected to the determining unit by using a bus. The memory may also be integrated with the determining unit.

The memory 703 is configured to store application program code for performing the solutions of this application, and the processor 701 controls execution. The processor 701 is configured to execute the application program code stored in the memory 703, to implement functions in the method in the present patent.

In specific implementation, in an embodiment, the processor 701 may include one or more CPUs, for example, a CPU 0 and a CPU 1 in FIG. 7.

In specific implementation, in an embodiment, the structure 700 may include a plurality of processors, for example, a processor 701 and a processor 707 in FIG. 7. Each of these processors may be a single-core processor, or may be a multi-core processor. The processor herein may be one or more devices, circuits, and/or processing cores configured to process data (for example, a computer program instruction).

In specific implementation, in an embodiment, the structure 700 may further include an output device 705 and an input device 706. The output device 705 communicates with the processor 701, and may display information in a plurality of manners. For example, the output device 705 may be a liquid crystal display (LCD), a light emitting diode (light emitting diode, LED) display device, or a cathode ray tube (CRT) display device, or a projector. The input device 706 communicates with the processor 701, and may receive user input in a plurality of manners. For example, the input device 706 may be a mouse device, a keyboard, a touchscreen device, or a sensor device.

In specific implementation, the structure 700 may be a desktop computer, a portable computer, a network server, a personal digital assistant (PDA), a mobile phone, a tablet computer, a wireless terminal device, a communications device, an embedded device, or a device having a structure similar to that in FIG. 7. The type of the structure 700 is not limited in this embodiment of this application.

Figure 8:
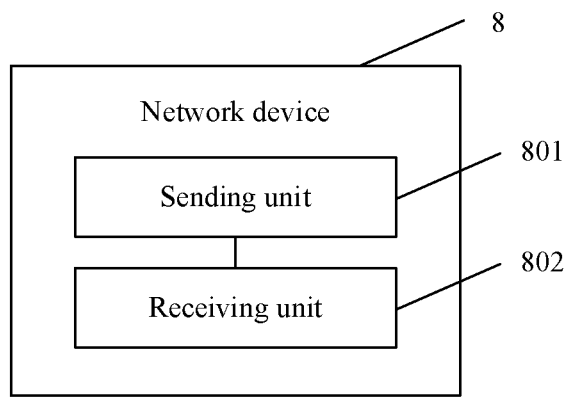
FIG. 8 is a schematic structural diagram of a network device according to an embodiment of this application.

When each functional module is obtained through division for each corresponding function, FIG. 8 shows a possible schematic structural diagram 1 of a network device 8 in the foregoing embodiment. The network device includes a sending unit 801 and a receiving unit 802. In this embodiment of this application, the sending unit 801 is configured to send a first resource configuration to a terminal device, where the first resource configuration is used to indicate a first resource, and the first resource is used by the terminal device to send data when the terminal device is in an idle mode. The receiving unit 802 is configured to receive first uplink data from the terminal device on the first resource. The sending unit 801 is configured to support the network device in performing the processes 301 and 305 in FIG. 3, and the processes 401 and 405 in FIG. 4. The receiving unit 802 is configured to support the network device in performing the process 304 in FIG. 3, and the process 404 in FIG. 4.

Figure 9:
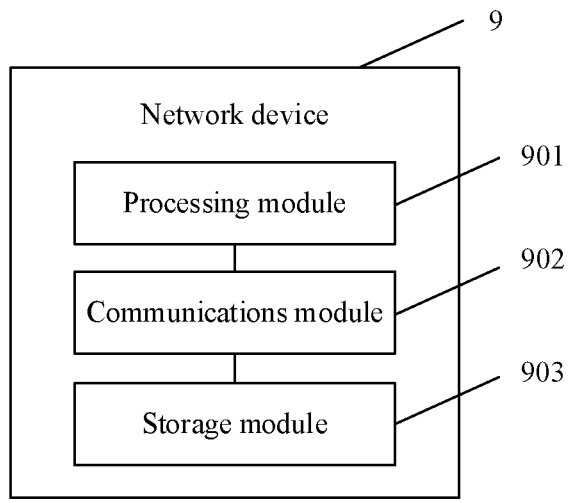
FIG. 9 is a schematic structural diagram of another network device according to an embodiment of this application.

When an integrated unit is used, FIG. 9 shows a possible schematic structural diagram 2 of a network device in the foregoing embodiment. In this application, the network device may include a processing module 901, a communications module 902, and a storage module 903. The processing module 901 is configured to control all parts of hardware apparatuses, application program software, and the like of the network device. The communications module 902 is configured to receive an instruction sent by another device, or may send data of the network device to another device. The storage module 903 is configured to store a software program, store data, run software, and the like of the network device. The processing module 901 may be a determining unit or a controller, for example, may be a CPU, a general purpose determining unit, a DSP, an ASIC, an FPGA, or another programmable logic device, a transistor logic device, a hardware component, or any combination thereof. The processor may implement or execute various example logical blocks, modules, and circuits described with reference to content disclosed in this application. The determining unit may also be a combination for implementing a calculation function, for example, a combination of one or more micromonitoring units, or a combination of a DSP and a micromonitoring unit. The communications module 902 may be a transceiver, a transceiver circuit, a communications interface, or the like. The storage module 903 may be a memory.

Figure 10:
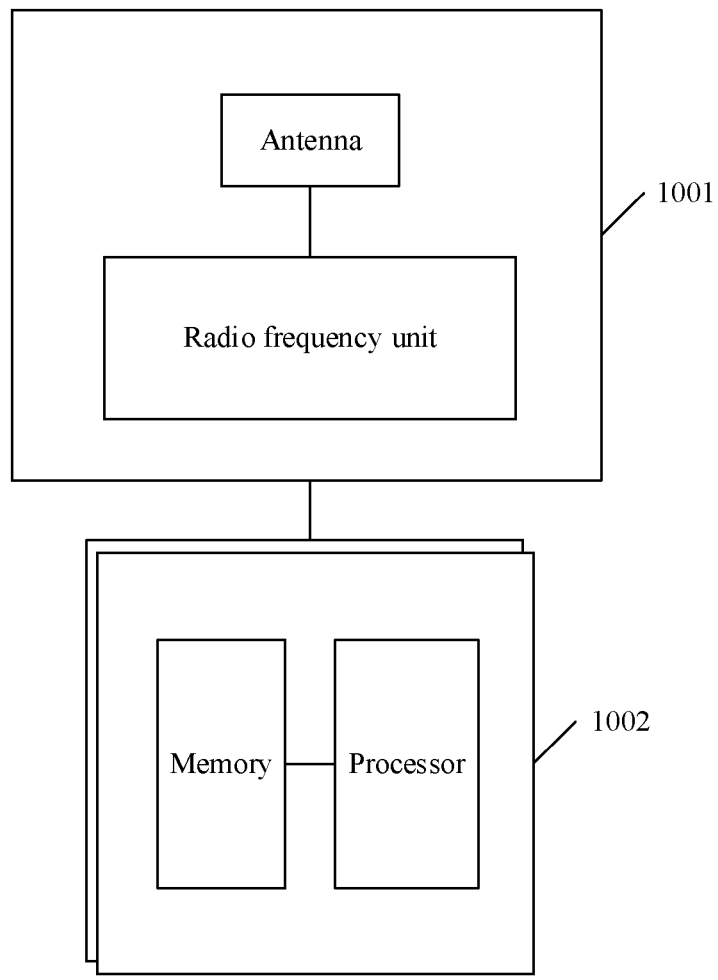
FIG. 10 is a schematic structural diagram of still another network device according to an embodiment of this application.

In a possible design, the network device may be implemented by using a base station in FIG. 10.

FIG. 10 is a schematic structural diagram of a base station according to an embodiment of this application. The base station includes a part 1001 and a part 1002. The part 1001 of the base station is mainly configured to receive and send a radio frequency signal and convert a radio frequency signal and a baseband signal. The part 1002 is mainly configured to perform baseband processing, control the base station, and the like. The part 1001 may be generally referred to as a transceiver unit, a transmitter machine, a transceiver circuit, a transceiver, or the like. The part 1002 is usually a control center of the base station, and may be generally referred to as a monitoring unit, and is configured to control the base station to perform the steps performed by the base station (namely, a serving base station) in FIG. 3. For specific descriptions, refer to the descriptions in the foregoing related parts.

The transceiver unit in the part 1001 may also be referred to as a transceiver, a transceiver, or the like, and includes an antenna and a radio frequency unit, where the radio frequency unit is mainly configured to perform radio frequency processing. Optionally, a component configured to implement a receiving function in the part 1001 may be considered as a receiving unit, and a component configured to implement a sending function may be considered as a sending unit. In other words, the part 1001 includes a receiving unit and a sending unit. The receiving unit may also be referred to as a receiver machine, a receiver, a receiving circuit, or the like, and the sending unit may be referred to as a transmitter machine, a transmitter, a transmitting circuit, or the like.

The Part 1002 may include one or more boards. Each board may include one or more determining units and one or more memories. The determining unit is configured to read and execute a program in the memory to implement a baseband processing function and control the base station. If there are a plurality of boards, the boards can be interconnected to improve the processing capability. In an optional implementation, the plurality of boards may share one or more determining units, or the plurality of boards may share one or more memories, or the plurality of boards may share one or more determining units at the same time. The memory and the determining unit may be integrated together, or may be disposed independently. In some embodiments, the part 1001 and the part 1002 may be integrated together, or may be disposed independently. In addition, all functions in the part 1002 may be integrated into one chip for implementation, or some functions may be integrated into one chip for implementation, and the other functions may be integrated into one or more other chips for implementation. This is not limited in this application.

A person skilled in the art should be aware that in the foregoing one or more examples, functions described in this application may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a determining unit of any other programmable data processing device to generate a machine, so that the instructions executed by a computer or a determining unit of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the embodiments of this application without departing from the scope of this application. This application is intended to cover these modifications and variations provided that they fall within the scope of protection defined by the following claims and their equivalent technologies.

What is claimed is:

1. A data transmission method, comprising:
receiving, by a terminal device, a first resource configuration from a network device, wherein the first resource configuration is used to indicate a first resource, and the first resource is used by the terminal device to send data when the terminal device is in an idle mode, wherein the first resource configuration includes a parameter indicating a time domain position and/or a frequency domain position of the first resource, and the first resource configuration further includes one or more of a repetition number of the first resource, a first cell radio network temporary identity of the terminal device, an RRC configuration that is used for data bearer establishment and/or access stratum AS security processing, or a periodic configuration of the first resource, wherein the first resource corresponds to a first coverage level and the terminal device matches the first coverage level, and the first resource configuration is further used to indicate a second resource, wherein the second resource corresponds to a second coverage level;
when the terminal device is in the idle mode and has to-be-sent first uplink data, sending, by the terminal device, the first uplink data to the network device on the first resource; and
if the terminal device fails to send the first uplink data on the first resource, sending, by the terminal device, the first uplink data on the second resource, and
if the terminal device fails to send the first uplink data on the second resource, then
sending, by the terminal device, a random access preamble to the network device, to perform uplink data transmission or uplink data transmission in an early data transmission manner.

2. The data transmission method according to claim 1, wherein
the terminal device stores a valid timing advance TA received from the network device, and a size of the first uplink data does not exceed a size of the first resource.

3. A data transmission method, comprising:
sending, by a network device, a first resource configuration to a terminal device, wherein the first resource configuration is used to indicate a first resource, and the first resource is used by the terminal device to send data when the terminal device is in an idle mode, wherein the first resource configuration includes a parameter indicating a time domain position and/or a frequency domain position of the first resource, and the first resource configuration further includes one or more of a repetition number of the first resource, a first cell radio network temporary identity of the terminal device, an RRC configuration that is used for data bearer establishment and/or access stratum AS security processing, or a periodic configuration of the first resource, and the first resource configuration is further used to indicate a second resource, wherein the first resource corresponds to a first coverage level and the terminal device matches the first coverage level, and the first resource configuration is further used to indicate a second resource, wherein the second resource corresponds to a second coverage level; and;

receiving, by the network device, first uplink data from the terminal device on the first resource; and receiving, by the network device, the first uplink data from the terminal device on the second resource, and if the network device fails to receive the first uplink data on the second resource, then receiving, by the network device, a random access preamble from the terminal device, to perform uplink data transmission or uplink data transmission in an early data transmission manner.

4. The data transmission method according to claim 3, wherein a size of the first uplink data does not exceed a size of the first resource; and before sending, by the network device, the first resource configuration to the terminal device, the method further comprises sending, by the network device, a valid timing advance TA to the terminal device.

5. A terminal device, comprising:

a processor; and a computer readable storage medium storing programming for execution by the processor, the programming including instructions to carry out a method comprising:

receiving a first resource configuration from a network device, wherein the first resource configuration is used to indicate a first resource, and the first resource is used by the terminal device to send data when the terminal device is in an idle mode, wherein the first resource configuration includes a parameter indicating a time domain position and/or a frequency domain position of the first resource, and the first resource configuration further includes one or more of a repetition number of the first resource, a first cell radio network temporary identity of the terminal device, an RRC configuration that is used for data bearer establishment and/or access stratum AS security processing, or a periodic configuration of the first resource, wherein the first resource corresponds to a first coverage level and the terminal device matches the first coverage level, and the first resource configuration is further used to indicate a second resource, wherein the second resource corresponds to a second coverage level;

when the terminal device is in the idle mode and has to-be-sent first uplink data, sending the first uplink data to the network device on the first resource; and if the terminal device fails to send the first uplink data on the first resource, sending the first uplink data on the second resource, and if the terminal device fails to send the first uplink data on the second resource, then sending a random access preamble to the network device, to perform uplink data transmission or uplink data transmission in an early data transmission manner.

6. The terminal device according to claim 5, wherein the terminal device stores a valid timing advance TA received from the network device, and a size of the first uplink data does not exceed a size of the first resource.

7. A network device, comprising:

a processor; and a computer readable storage medium storing programming for execution by the processor, the programming including instructions to carry out a method comprising:

sending a first resource configuration to a terminal device, wherein the first resource configuration is used to indicate a first resource, and the first resource is used by the terminal device to send data when the terminal device is in an idle mode, wherein the first resource configuration includes a parameter indicating a time domain position and/or a frequency domain position of the first resource, and the first resource configuration further includes one or more of a repetition number of the first resource, a first cell radio network temporary identity of the terminal device, an RRC configuration that is used for data bearer establishment and/or access stratum AS security processing, or a periodic configuration of the first resource, wherein the first resource corresponds to a first coverage level and the terminal device matches the first coverage level, and the first resource configuration is further used to indicate a second resource, wherein the second resource corresponds to a second coverage level;

receiving first uplink data from the terminal device on the first resource; and receiving the first uplink data from the terminal device on the second resource, and if the network device fails to receive the first uplink data on the second resource, then receiving a random access preamble from the terminal device, to perform uplink data transmission or uplink data transmission in an early data transmission manner.

8. The network device according to claim 7, wherein a size of the first uplink data does not exceed a size of the first resource; and before sending a first resource configuration to a terminal device, the method further comprises sending a valid timing advance TA to the terminal device.

* * * * *